United States Patent
Schelstraete

(10) Patent No.: US 10,219,169 B1
(45) Date of Patent: Feb. 26, 2019

(54) HYBRID MU-MIMO SPATIAL MAPPING USING BOTH EXPLICIT SOUNDING AND CROSSTALK TRACKING IN A WIRELESS LOCAL AREA NETWORK

(71) Applicant: Quantenna Communications, Inc., Fremont, CA (US)

(72) Inventor: Sigurd Schelstraete, Menlo Park, CA (US)

(*) Notice: Subject to any disclaimer, the term of this patent is extended or adjusted under 35 U.S.C. 154(b) by 60 days.

(21) Appl. No.: 15/207,451

(22) Filed: Jul. 11, 2016

Related U.S. Application Data

(60) Provisional application No. 62/190,648, filed on Jul. 9, 2015.

(51) Int. Cl.
*H04B 7/04* (2017.01)
*H04L 5/00* (2006.01)
(Continued)

(52) U.S. Cl.
CPC .............. *H04W 24/02* (2013.01); *H04B 7/04* (2013.01); *H04B 7/0452* (2013.01); *H04B 7/0456* (2013.01); *H04B 17/336* (2015.01); *H04L 5/0055* (2013.01); *H04L 43/16* (2013.01); *H04W 72/042* (2013.01);
(Continued)

(58) Field of Classification Search
CPC ...... H04B 7/04; H04B 7/0417; H04B 7/0421; H04B 7/043; H04B 7/0452; H04B 7/0456; H04B 7/0626; H04B 7/0628; H04B 7/0643; H04B 17/336; H04L 5/0055; H04L 25/0242; H04L 43/16; H04L 2025/03426; H04W 24/02; H04W 72/042;
(Continued)

(56) References Cited

U.S. PATENT DOCUMENTS

| | | | |
|---|---|---|---|
| 7,746,943 B2 * | 6/2010 | Yamaura | H04B 7/0408 375/260 |
| 7,764,931 B2 * | 7/2010 | Kim | H04B 7/0417 370/295 |

(Continued)

FOREIGN PATENT DOCUMENTS

| | | | | |
|---|---|---|---|---|
| WO | WO-2011152638 A2 * | 12/2011 | | H04B 7/0639 |
| WO | WO-2011152638 A3 * | 3/2012 | | H04B 7/0639 |

*Primary Examiner* — Eric Nowlin

(57) ABSTRACT

A wireless access point supporting a wireless local area network (WLAN) including multiple-input multiple-output (MIMO) communications with associated stations, is disclosed with hardware processing circuitry to perform hybrid spatial mapping operations for multi-user (MU) MIMO downlinks including: explicit channel sounding and crosstalk damping circuits. The explicit channel sounding circuit determines from communication channel feedback, a MU-MIMO precode matrix "Q" for spatially mapping a transmission of an MU-MIMO downlink communication packet to corresponding ones of a group of stations. The crosstalk damping circuit is responsive to crosstalk feedback from at least one of the stations in the MU-MIMO group to incrementally adjust elements of the precode matrix "Q" in a direction which reduces the amount of crosstalk; and to spatially map subsequently transmitted MU-MIMO downlink communication packets with the adjusted precode matrix "Q'". A complementary wireless station is disclosed.

6 Claims, 7 Drawing Sheets

(51) Int. Cl.
    *H04L 12/26* (2006.01)
    *H04W 24/02* (2009.01)
    *H04W 72/04* (2009.01)
    *H04W 74/08* (2009.01)
    *H04W 84/12* (2009.01)
    *H04W 88/08* (2009.01)
    *H04B 17/336* (2015.01)
    *H04B 7/0452* (2017.01)
    *H04B 7/0456* (2017.01)

(52) U.S. Cl.
    CPC .... *H04W 74/0808* (2013.01); *H04Q 2201/14* (2013.01); *H04W 84/12* (2013.01); *H04W 88/08* (2013.01)

(58) Field of Classification Search
    CPC . H04W 74/0808; H04W 84/12; H04W 88/08; H04Q 2201/14
    See application file for complete search history.

(56) References Cited

U.S. PATENT DOCUMENTS

| | | | | |
|---|---|---|---|---|
| 7,848,444 B2* | 12/2010 | Yamaura | H04B 7/0421 | 375/260 |
| 8,260,198 B2* | 9/2012 | Yamaura | H04B 7/0417 | 455/39 |
| 8,290,079 B2* | 10/2012 | Li | H04B 7/0634 | 375/260 |
| 8,295,263 B1* | 10/2012 | Chen | H04L 1/16 | 370/345 |
| 8,532,569 B2* | 9/2013 | Yamaura | H04B 7/0417 | 455/39 |
| 8,547,955 B2* | 10/2013 | Niu | H04B 7/0417 | 370/345 |
| 8,600,308 B2* | 12/2013 | Tang | H04B 7/024 | 375/259 |
| 8,615,198 B2* | 12/2013 | Han | H04B 7/024 | 370/329 |
| 8,619,612 B2* | 12/2013 | Niu | H04B 7/063 | 370/252 |
| 8,750,205 B2* | 6/2014 | Chen | H04B 7/024 | 370/328 |
| 8,787,842 B2* | 7/2014 | Luschi | H04L 1/0029 | 455/69 |
| 8,804,612 B1* | 8/2014 | Chen | H04B 7/0456 | 370/252 |
| RE45,150 E* | 9/2014 | Yamaura | H04B 7/0408 | 375/260 |
| 8,867,495 B2* | 10/2014 | Farajidana | H04B 7/0417 | 370/252 |
| 8,891,653 B2* | 11/2014 | Seok | H04B 7/0632 | 375/267 |
| 8,971,178 B1* | 3/2015 | Nabar | H04J 3/16 | 370/220 |
| 9,036,608 B2* | 5/2015 | Chen | H04B 7/0689 | 370/310.2 |
| 9,071,435 B2* | 6/2015 | Shany | H04B 7/0452 | |
| 9,078,142 B1* | 7/2015 | Zhan | H04W 16/28 | |
| 9,119,209 B2* | 8/2015 | Nam | H04W 72/046 | |
| 9,124,313 B2* | 9/2015 | Ko | H04B 7/024 | |
| 9,172,446 B2* | 10/2015 | Harel | H04L 5/0073 | |
| 9,172,561 B2* | 10/2015 | Luo | H04B 7/024 | |
| 9,184,511 B2* | 11/2015 | Ma | H01Q 25/00 | |
| 9,231,671 B1* | 1/2016 | Zhan | H04B 7/0413 | |
| 9,252,853 B2* | 2/2016 | Sajadieh | H04L 5/0085 | |
| 9,461,724 B1* | 10/2016 | Schelstraete | H04L 25/0204 | |
| 9,484,997 B2* | 11/2016 | Nammi | H04B 7/0486 | |
| 9,503,166 B2* | 11/2016 | Janse van Rensburg | H04L 5/14 | |
| 9,621,240 B1* | 4/2017 | Zhang | H04B 7/0417 | |
| 9,622,219 B2* | 4/2017 | Takano | H04W 72/04 | |
| 9,634,750 B2* | 4/2017 | Kwak | H04B 7/0617 | |
| 9,647,736 B1* | 5/2017 | Schelstraete | H04B 7/0456 | |
| 9,648,622 B2* | 5/2017 | Takano | H04W 72/046 | |
| 9,686,005 B2* | 6/2017 | Kim | H04B 7/0413 | |
| 9,742,480 B1* | 8/2017 | Nammi | H04B 7/0486 | |
| 9,843,409 B2* | 12/2017 | Milleth | H04J 11/0056 | |
| 9,871,639 B2* | 1/2018 | Lee | H04L 5/0048 | |
| 9,888,463 B2* | 2/2018 | Zhang | H04J 11/005 | |
| 9,906,346 B2* | 2/2018 | Zhao | H04B 7/0413 | |
| 9,954,598 B2* | 4/2018 | Astrom | H04B 7/18506 | |
| 2006/0098580 A1* | 5/2006 | Li | H04B 7/0408 | 370/245 |
| 2006/0165191 A1* | 7/2006 | Lin | H04B 7/0417 | 375/267 |
| 2007/0258541 A1* | 11/2007 | Yamaura | H04B 7/0408 | 375/267 |
| 2007/0286303 A1* | 12/2007 | Yamaura | H04B 7/0421 | 375/267 |
| 2008/0043677 A1* | 2/2008 | Kim | H04B 7/0417 | 370/332 |
| 2008/0260058 A1* | 10/2008 | Li | H04B 7/0634 | 375/260 |
| 2009/0207765 A1* | 8/2009 | Yamaura | H04B 7/0417 | 370/310 |
| 2010/0238824 A1* | 9/2010 | Farajidana | H04B 7/0417 | 370/252 |
| 2010/0248651 A1* | 9/2010 | Dent | H01Q 1/246 | 455/78 |
| 2010/0322351 A1* | 12/2010 | Tang | H04B 7/024 | 375/316 |
| 2011/0007685 A1* | 1/2011 | Ma | H01Q 25/00 | 370/315 |
| 2011/0026421 A1* | 2/2011 | Luo | H04B 7/024 | 370/252 |
| 2011/0032839 A1* | 2/2011 | Chen | H04B 7/024 | 370/252 |
| 2011/0053633 A1* | 3/2011 | Han | H04B 7/024 | 455/522 |
| 2011/0124290 A1* | 5/2011 | Lou | H04B 7/0689 | 455/63.1 |
| 2011/0273977 A1* | 11/2011 | Shapira | H04B 7/0452 | 370/208 |
| 2012/0026991 A1* | 2/2012 | Niu | H04B 7/0417 | 370/338 |
| 2012/0051287 A1* | 3/2012 | Merlin | H04B 7/0617 | 370/328 |
| 2012/0087423 A1* | 4/2012 | Ko | H04B 7/024 | 375/259 |
| 2012/0093089 A1* | 4/2012 | Park | H04B 7/0417 | 370/328 |
| 2012/0230443 A1* | 9/2012 | Seok | H04B 7/0632 | 375/260 |
| 2012/0269158 A1* | 10/2012 | Yamaura | H04B 7/0417 | 370/329 |
| 2012/0281631 A1* | 11/2012 | Yamaura | H04B 7/0417 | 370/328 |
| 2013/0070723 A1* | 3/2013 | Yie | H04B 7/0639 | 370/329 |
| 2013/0315222 A1* | 11/2013 | Yamaura | H04B 7/0417 | 370/338 |
| 2013/0315331 A1* | 11/2013 | Yamaura | H04B 7/0417 | 375/267 |
| 2013/0315333 A1* | 11/2013 | Yamaura | H04B 7/0417 | 375/267 |
| 2014/0010216 A1* | 1/2014 | Niu | H04B 7/0417 | 370/336 |
| 2014/0133317 A1* | 5/2014 | Chen | H04B 7/0689 | 370/252 |
| 2015/0016379 A1* | 1/2015 | Nam | H04B 7/0456 | 370/329 |
| 2015/0103934 A1* | 4/2015 | Nam | H04B 7/0413 | 375/260 |
| 2015/0200718 A1* | 7/2015 | Sajadieh | H04L 5/0085 | 375/267 |
| 2015/0237600 A1* | 8/2015 | Takano | H04W 72/04 | 370/329 |

(56) References Cited

U.S. PATENT DOCUMENTS

| | | | |
|---|---|---|---|
| 2015/0249490 A1* | 9/2015 | Chen | H04B 7/0689 375/295 |
| 2015/0270880 A1* | 9/2015 | Harel | H04L 5/0073 370/338 |
| 2015/0282001 A1* | 10/2015 | Kwak | H04B 7/0617 370/229 |
| 2015/0288435 A1* | 10/2015 | Nammi | H04B 7/0486 375/267 |
| 2015/0326340 A1* | 11/2015 | Huang | H04B 7/0413 375/267 |
| 2015/0372741 A1* | 12/2015 | Kim | H04B 7/0413 370/329 |
| 2016/0127019 A1 | 5/2016 | Schelstraete | |
| 2016/0149684 A1* | 5/2016 | Zhao | H04B 7/0413 370/252 |
| 2016/0183228 A1* | 6/2016 | Song | H04L 5/0048 370/330 |
| 2016/0277082 A1* | 9/2016 | Janse van Rensburg | H04L 5/14 |
| 2016/0294454 A1* | 10/2016 | Onggosanusi | H04B 7/0456 |
| 2016/0309456 A1* | 10/2016 | Cheong | H04W 52/241 |
| 2016/0337156 A1* | 11/2016 | Milleth | H04J 11/0056 |
| 2016/0359538 A1* | 12/2016 | Onggosanusi | H04B 7/0469 |
| 2017/0005708 A1* | 1/2017 | Bhat | H04B 7/0452 |
| 2017/0063438 A1* | 3/2017 | Baik | H04L 5/006 |
| 2017/0126308 A1* | 5/2017 | Astrom | H04B 7/18506 |
| 2017/0195934 A1* | 7/2017 | Kang | H04W 36/30 |
| 2017/0201892 A1* | 7/2017 | Wen | H04W 16/28 |
| 2017/0208613 A1* | 7/2017 | Nam | H04B 7/0456 |
| 2017/0244533 A1* | 8/2017 | Onggosanusi | H04B 7/0478 |
| 2017/0257884 A1* | 9/2017 | Rahman | H04B 7/0626 |
| 2017/0288746 A1* | 10/2017 | Strong | H04B 7/0452 |
| 2017/0317727 A1* | 11/2017 | Wang | H04B 7/0452 |
| 2017/0353222 A1* | 12/2017 | Wei | H04B 7/0469 |
| 2017/0373732 A1* | 12/2017 | Niu | H04B 7/0417 |
| 2018/0013478 A1* | 1/2018 | Chen | H04L 1/00 |
| 2018/0048365 A1* | 2/2018 | Yoo | H04B 7/0456 |
| 2018/0069611 A1* | 3/2018 | Kim | H04B 7/0478 |
| 2018/0069680 A1* | 3/2018 | Lee | H04L 5/0048 |
| 2018/0076940 A1* | 3/2018 | Zhou | H04B 7/04 |
| 2018/0091207 A1* | 3/2018 | Kakishima | H04B 7/0413 |
| 2018/0205438 A1* | 7/2018 | Davydov | H04B 7/0469 |
| 2018/0227029 A1* | 8/2018 | Nammi | H04B 7/0626 |
| 2018/0278315 A1* | 9/2018 | Wu | H04B 7/0626 |

* cited by examiner

PRIOR ART  WLAN Channels

PRIOR ART  WLAN Activity

PRIOR ART  WLAN Sounding

PRIOR ART  WLAN Packet Header

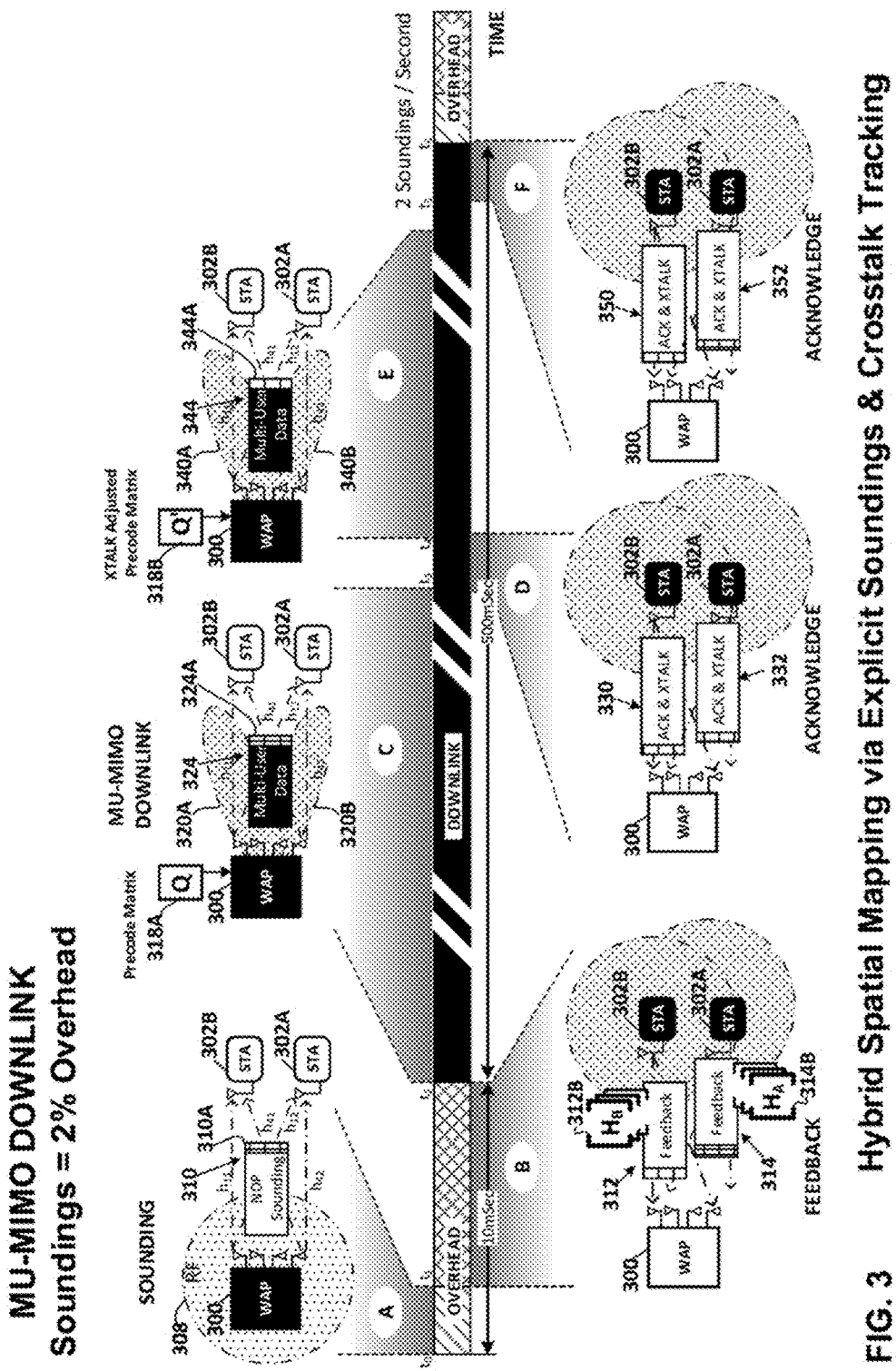
FIG. 3  Hybrid Spatial Mapping via Explicit Soundings & Crosstalk Tracking

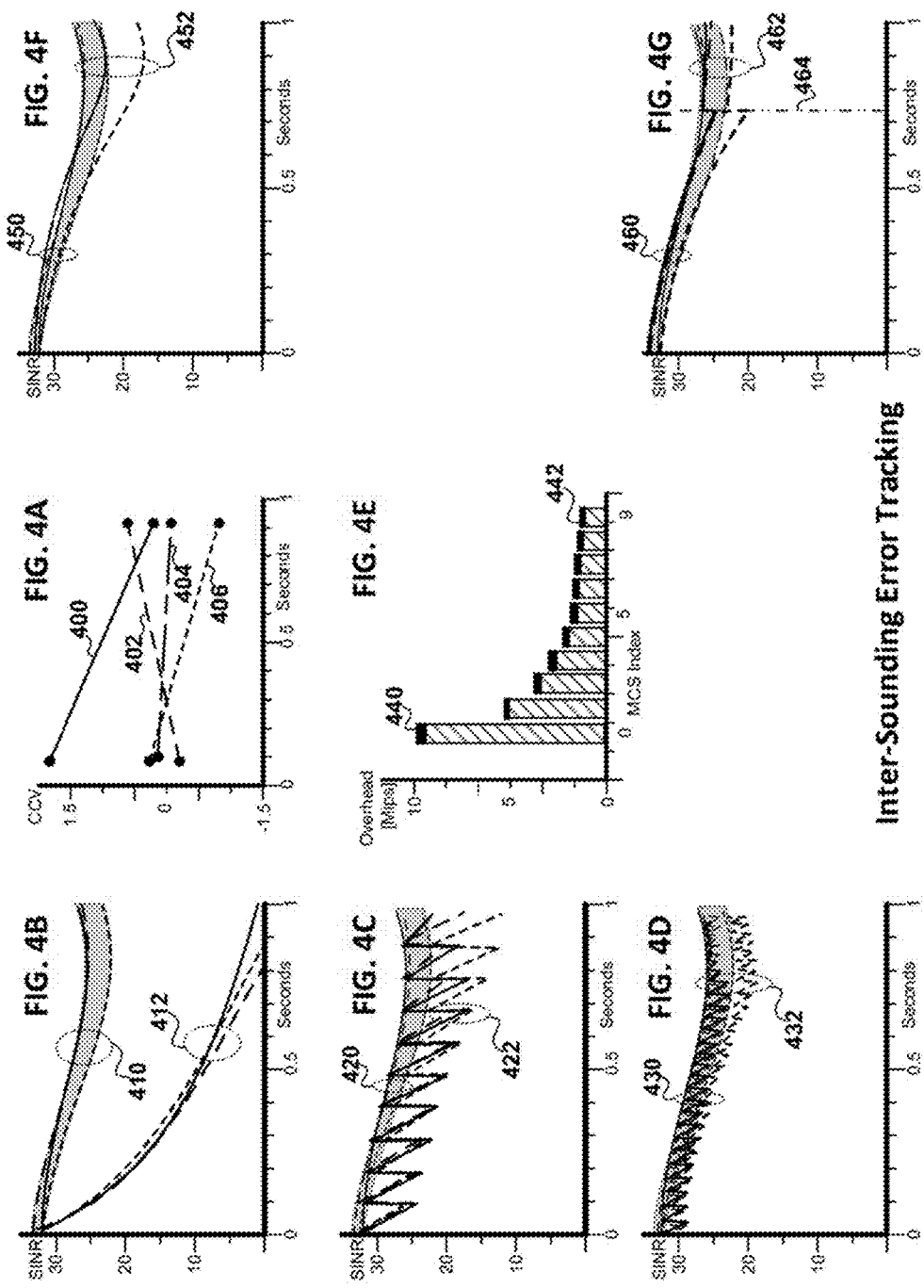

HYBRID MU-MIMO SPATIAL MAPPING USING BOTH EXPLICIT SOUNDING AND CROSSTALK TRACKING IN A WIRELESS LOCAL AREA NETWORK

CROSS REFERENCE TO RELATED APPLICATION

This application claims the benefit of prior filed Provisional Application No. 62/190,648 filed on Jul. 9, 2015 entitled "MU Precoding for Changing Channels" which is incorporated herein by reference in its entirety as if fully set forth herein.

BACKGROUND OF THE INVENTION

1. Field of Invention

The field of the present invention relates in general to wireless local area networks (WLAN) including wireless access points (WAP) and wireless stations and methods for spatial mapping of multi-user communications on same.

2. Description of the Related Art

Home and office networks, a.k.a. wireless local area networks (WLAN) are established and serviced using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. To confirm arrival of each communication packet, the target node is required to send back an acknowledgment, a.k.a. "ACK" packet to the source. Absent the receipt of the ACK packet the source will retransmit the unacknowledged data until an acknowledgement is received, or a time-out is reached.

Where communications are from one source to more than one target concurrently, and where further the data for each target is discrete from that destined for other targets, the communication is identified as multi-user (MU) multiple-input multiple-output (MIMO) communication. This communication capability requires complex signal processing and multiple antennas on at least the transmitting device, e.g. the wireless access point (WAP). MU-MIMO capability was first introduced into the IEEE 802.11 specification in the "ac" standard and is intended to increase WAP throughput by allowing the MIMO capabilities of the WAP to be exploited efficiently by downlinking the WAP to multiple stations at once via an MU-MIMO downlink communication packet having a payload portion containing discrete individual communication packets for each of the targeted stations in the MU-MIMO group. The complex signal processing required to support this capability provides spatial separation of each downlink packet transmitted by the WAP so that the discrete payload portions of each packet arrive at each targeted station in the MU-MIMO group without interference from the portion of each packet destined for others of the stations in the MU-MIMO group. A precode matrix input to a spatial mapper achieves this outcome. The precode matrix itself requires frequent interruptions of the MU-MIMO downlink communications, in order for each station in the group to be explicitly sounded, and further to provide feedback to the WAP as to the communication channel determined by each station in response to the explicit sounding. Typically an MU-MIMO downlink will required ten or more explicit soundings per second, i.e. at least 1 explicit sounding every 100 ms. MU-MIMO is particularly appropriate or effective when the stations chosen for a MU-MIMO group have capabilities and corresponding data consumption requirements which do not individually present a burden to the WAP. A typical MU-MIMO target station group would have a fraction of the antennas of the WAP and relatively low individual data consumption requirements.

What is needed is are improvements in MIMO communication capabilities on residential/business WLAN.

SUMMARY OF THE INVENTION

The present invention provides a method and apparatus for reducing the overhead associated with frequent explicit channel soundings for multi-user (MU) multiple-input multiple-output (MIMO) downlink communication packet transmissions on a wireless local area network (WLAN) by use of crosstalk feedback from one or more of the group of stations targeted for the MU-MIMO downlink communication packets during the course of such downlink communications.

In an embodiment of the invention a wireless access point (WAP) having a plurality of antennas and supporting a wireless local area network (WLAN) including multiple-input multiple-output (MIMO) communications with associated stations on a selected one of a plurality of communication channels, is disclosed with hardware processing circuitry to perform hybrid spatial mapping operations for multi-user (MU) MIMO downlinks including in such circuitry an explicit channel sounding circuit and a crosstalk damping circuit. The explicit channel sounding circuit determines from communication channel feedback, a multi-user (MU) MIMO precode matrix "Q" for spatially mapping a transmission of discrete portions of a payload of an MU-MIMO downlink communication packet to achieve crosstalk-free reception at the corresponding ones of a group of the associated stations targeted by the MU-MIMO downlink. The crosstalk damping circuit is responsive to crosstalk feedback from at least one of the stations in the MU-MIMO group to incrementally adjust elements of the precode matrix "Q" in a direction which reduces the amount of crosstalk at the receivers; and to spatially map subsequently transmitted MU-MIMO downlink communication packets with the adjusted precode matrix "Q", thereby improving downlink communications between explicit soundings.

In another embodiment of the invention a complementary wireless station is disclosed with hardware processing circuitry to perform hybrid spatial mapping feedback operations for multi-user (MU) multiple-input multiple-output (MIMO) downlinks from the WAP to a group of associated stations, and including in such circuitry a channel estimation circuit and a crosstalk estimation circuit. The channel estimation circuit is responsive to an explicit sounding received from the WAP to determine a communication channel associated therewith and to transmit feedback to the WAP as to the determined communication channel. The crosstalk estimation circuit is responsive to receipt of a MU-MIMO downlink communication packet from the WAP to determine an amount of crosstalk from portions of the downlink MU-MIMO communication packet targeted for other stations in the group and to transmit feedback to the WAP as to the determined crosstalk.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIG. 3 is a timeline of a MU-MIMO downlink in accordance with an embodiment of the invention incorporating hybrid spatial mapping using both explicit sounding and crosstalk tracking;

FIG. 4A is a graphs of communication channel variations as a function of time;

FIGS. 4B-D are graphs of communication channel variations as a function of time with and without explicit soundings;

FIG. 4E is a graph of explicit sounding overhead as a function of modulation and code schema (MCS) used to transmit sounding feedback;

FIGS. 4F-G are graphs of communication channel variations as a function of time with the hybrid spatial mapping of an embodiment of the invention;

DETAILED DESCRIPTION OF TH EMBODIMENTS

Figure 1:
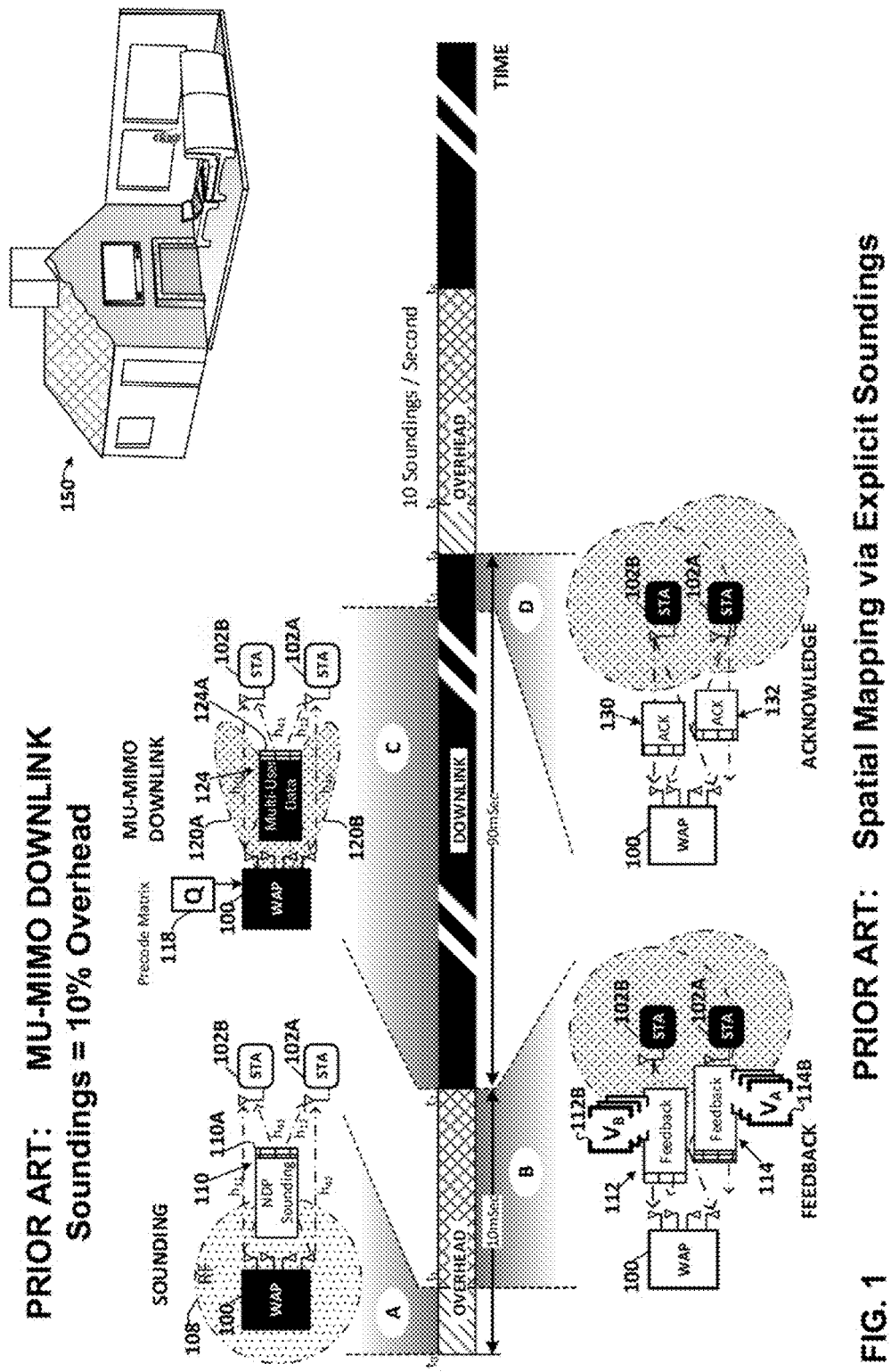
FIG. 1 is a timeline of a Prior Art MU-MIMO downlink showing sounding overhead and downlink portions.

FIG. 1 is a timeline of a Prior Art MU-MIMO downlink showing sounding overhead and downlink portions. The timeline shows a wireless access point (WAP) 100 and associated stations 102A-B of a residential 150 wireless local area network (WLAN) during various phases of operation associated with an MU-MIMO downlink. Each packet in an MU-MIMO downlink has a payload portion which contains distinct blocks of data each destined for a corresponding one of the stations in the MU-MIMO downlink group. An MU-MIMO packet allows transmission of discrete payload data to two or more receiving stations at the same time, thus increasing WLAN throughput. Ideally, each station in the group receives a common MU-MIMO packet header, and its own distinct block of data. The distinct blocks of data in the MU-MIMO packet payload are said to be spatially mapped during transmission so as to arrive at each corresponding one of the stations, without interference, a.k.a. crosstalk, from the distinct blocks of data destined for other stations in the group. Spatial mapping involves complex signal processing using the multiple antennas of the WAP and a precoding matrix to spatially separate the distinct blocks of data in the MU-MIMO packet payload among the targeted MU-MIMO group of stations. The determination of the precode matrix, requires detailed channel information feedback from each of the targeted stations in response to an explicit sounding. The feedback from each station as to its communication channel with the WAP is aggregated by the WAP and used to determine the precode matrix for transmitting subsequent MU-MIMO downlink packets. Minute changes in the communication channels blur the spatial separation so as to require frequent explicit soundings, e.g. ten per second, to recalculate the precode matrix. No data is transmitted during these explicit soundings, thus they are characterized as overhead required to support MU-MIMO downlinks.

The timeline in FIG. 1 includes an overhead portion including the sounding and feedback phases "A" and "B" respectively of an Explicit sounding over a representative interval, e.g. 10 milliseconds. The explicit sounding is initiated at time to with the sounding transmissions 108 by the WAP 100. The sounding is conducted on a selected one of the communication channels available to the WLAN. The sounding phase is initiated with a null data packet announcement (NDPA) (not shown) which announces the group of target stations selected for the MU-MIMO sounding and subsequent downlink. This announcement packet is followed by a null data packet (NDP) 110. Both the NDPA and the NDP packets are sent using an isotropic RF signal strength 108. Neither the NDPA nor the NDP contains any user data. These packets are explicitly dedicated to soliciting a sounding of the link channel. The header 110A of the NDP contains a Very High Throughput Long Training Field, a.k.a. VHT-LTF, which the receiving stations targeted for the MU-MIMO downlink, i.e. stations 102A-B use to characterize the respective link channels $H_a$ and $H_b$. Each receiving station 102A-B determines the respective link channel $H_n$, where "n" is the sub-channel or tone index, for each of the OFDM tones or sub-channels of the selected channel. Each of the targeted stations convert this channel information into feedback in the form of: a beamsteering matrix "V" and a per tone Signal-to-Noise Matrix "SNR". The targeted stations 102A-B will then over the interval $t_1$-$t_2$, send the respective feedback packets 114, 112 including in the payload portion thereof, the corresponding "V" and "SNR" matrices. If the sounding feedback conforms to the IEEE 802.11ac standard, each feedback packet 112, 114 will include the V and SNR matrices 112B, 114B respectively for each sub-channel or tone of the corresponding WAP-station sounding. The WAP 100 aggregates this received feedback and determines a precoding matrix "Q" 118 therefrom.

The next portion of the prior art MU-MIMO timeline shown in FIG. 1 is the downlink portion including the downlink transmission and receipt acknowledgement phases "C" and "D" respectively of an MU-MIMO downlink over a representative interval, e.g. 90 milliseconds. The precoding matrix "Q" 118 for each tone or subchannel, a.k.a. the beamsteering matrices, are starting at time $t_2$, used for spatially mapping the transmitted MU-MIMO packet to the stations 102A-B. The MU-MIMO packet 124 includes a header 124A and a payload portion. The spatial mapping of the payload portion of the MU-MIMO packet 124 allows the distinct block of data for station 102A and the distinct block of data for station 102B to arrive at their respective target stations without crosstalk or interference from the other block of data. The precoding applied by the spatial mapper to the transmitted payload produces the distinctly anisotropic RF signal strength multi-lobe pattern 120A-120B. At time $t_3$ each station receiving the MU-MEMO packet 124 acknowledges receipt of the packet in an "ACK" packet. In this example where the MU-MIMO group comprises two stations 102A and 102B, each of which separately acknowledge receipt of the packet in ACK packets 132, 130 respectively. The WAP will resend any packet for which it has not received a receipt acknowledgement. Since slight changes in the respective communication channels are expected the soundings are frequently repeated, e.g. 100 millisecond intervals in other words ten times per second, with the precode matrix recalculated each time. Thus the overhead related to maintaining the MU-MIMO downlink is 10% or 10 milliseconds out of every 100 millisecond interval.

FIGS. 2A-2D are a representative Prior Art channel graph, a Prior Art WLAN timing diagram including soundings, a Prior Art detailed explicit sounding timing diagram, and a Prior Art packet diagram of a WLAN packets including the sounding field.

Figure 2A:
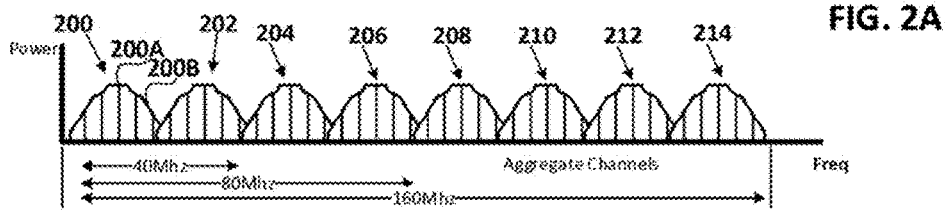
FIGS. 2A-2D are a representative Prior Art channel graph, a Prior Art WLAN timing diagram including soundings, a Prior Art detailed explicit sounding timing diagram, and a Prior Art packet diagram of a WLAN packets including the sounding field.

FIG. 2A is a representative Prior Art channel graph in which the x and y axis dimension frequency vs. power respectively for the eight 20 MHz communication channels, 200-214. Each communication channel may be selected individually to support a wireless local area network (WLAN). Alternately more than one of the 20 Mhz channels can be aggregated in various combinations to form a 40 Mhz, 80 Mhz or 160 Mhz Aggregate channel to support WLAN communications. Each 20 Mhz communication channel is orthogonal frequency division multiplexed (OFDM), i.e. divided into sub-channels or tones. Each 20 Mhz channel has 56 independently modulated sub-carriers or tones. Communication channel 200 has sub-channels a.k.a. tones, e.g. sub-channels 200A, 200B. This channel layout corresponds to that specified in IEEE 802.11ac for example.

Figure 2B:
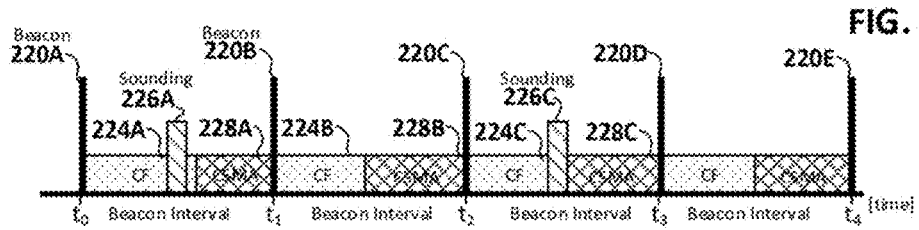

FIG. 2B is a representative Prior Art WLAN timing diagram including soundings. A typical operation of a WLAN includes beacon frames 220A-E sent periodically, e.g. at 100 ms intervals $t_0$-$t_5$. In a representative beacon interval, $t_0$-$t_1$ the following sub-intervals are shown: a contention free interval 224A, a sounding interval 226A and a contention interval 228A. During the contention free interval the WAP sends downlink user data communications sequentially to one or more of the stations in the WLAN. During the sounding interval one or more downstream links are probed to determine the channel characteristics thereof and using the CSI in the feedback from the sounding the beamforming matrix for each link subject to the sounding is determined. The soundings are conducted on a per link basis. The sounding feedback is different for each link. During the contention based interval carrier sense multiple access (CSMA) is used as a medium access control (MAC) methodology to allow any station to seize control of the channel and send uplink user data communications thereon to the WAP. In the next beacon interval $t_1$-$t_2$ there is a contention free interval 224B and a contention interval 228B. In the next beacon interval $t_2$-$t_3$ there is a contention free interval 224C, including one or more soundings 226C, and a contention interval 228C.

Figure 2C:
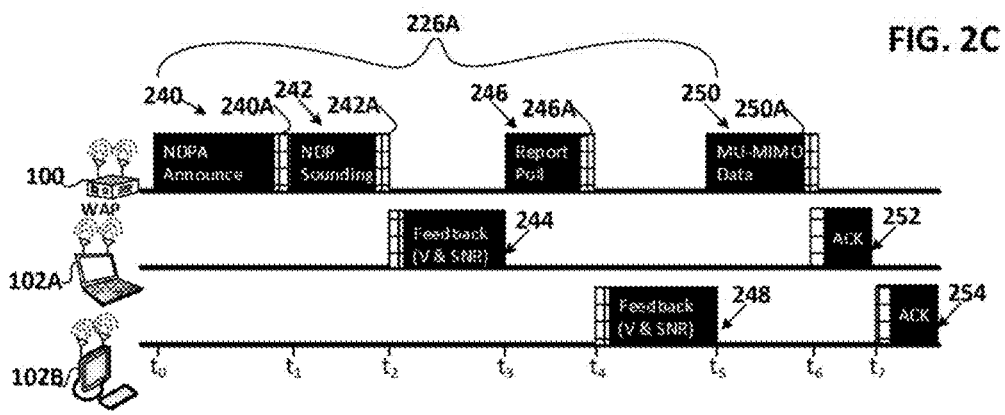

FIG. 2C is a Prior Art detailed explicit sounding timing diagram for an MU-MIMO downlink showing a detailed view of a representative sounding 226A as shown in FIG. 2B. An Explicit sounding of the link channels between the WAP and station 108 and the WAP and station 112 are shown. The packets 240, 242, 244, 246, 248 are all associated with the sounding. All packets including those associated with the sounding, include a header portion shown in crosshatch and referenced with the "A" suffix. Following the sounding, downlink MU-MIMO packet transmissions resume, and user data, e.g. MU-MIMO packet 250, is sent to the targeted group of stations using the precoding matrix derived from the channel sounding feedback.

The explicit sounding provided for in the IEEE 802.11ac standard allows the receiving station(s) to assist the transmitting WAP to steer subsequent user data communications toward the station(s) using the beamforming matrix(s) provided by the station(s) in response to the explicit channel sounding initiated by the WAP. In the example shown the WAP 102 initiates the explicit sounding by sending at time to a null data packet announcement (NDPA) frame 240. The NDPA identifies the WAP and the target recipient station(s) for the sounding. Where more than one station is a target recipient, e.g. an MU-MIMO downlink, the order in which the recipient stations are listed controls the order of their feedback response. Next at time $t_1$ a null data packet (NDP) 242 is sent by the WAP. This packet like all the other packets associated with the sounding contains no user data rather the header of the packet 242A contains a ubiquitous preamble field, which in the case of the IEEE 802.11ac standard is identified as the VHT-LTF field 266 shown in FIG. 2D. The VHT-LTF field a.k.a. channel estimation or sounding field, contains a long training sequence used for MIMO channel estimation by the receiver. The first intended target e.g. station 108 in the MU-MIMO group, then responds at time $t_2$ with the beamforming feedback packet 244 containing communication channel feedback. If the receiving station is IEEE 802.11n compliant the feedback can be in any one of three formats, the link channel matrix H being one of them. If the receiving station is IEEE 802.11ac compliant the feedback is in the form of the actual unitary beamsteering matrix V and the per tone diagonal matrix SNR. Any remaining stations targeted by the initial sounding, respond with the communication channel feedback for their own link when asked to do so by the WAP. The WAP sends a report poll packet 246 at time $t_3$ identifying the next station from which sounding feedback is requested. That station, e.g. station 112, then responds at time $t_4$ with beamforming feedback packet 248. Next, at time is the communication of user data packets resumes and user data, e.g. MU-MIMO packet 250, is sent on the link(s) that have been sounded using the associated precoding/beamforming matrix determined during the preceding sounding.

Figure 2D:
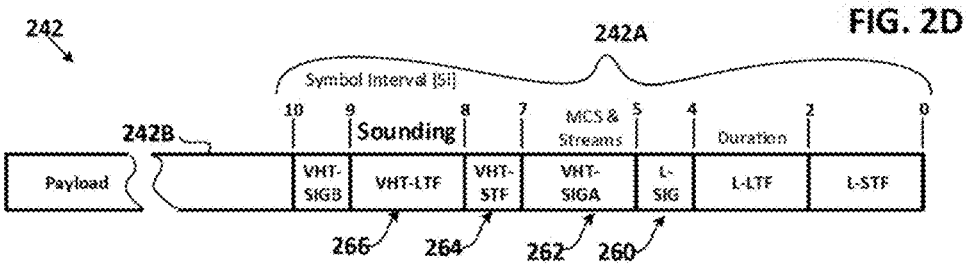

FIG. 2D a Prior Art packet diagram of a WLAN packets including the sounding field. All WLAN packets whether associated with communicating a sounding or with the communication of user data include a ubiquitous header portion. All WLAN packet headers include various preamble fields with known sequences which allow the receiving station to synchronize reception with packet boundaries and to determine the received channel. What makes a sounding packet a sounding packet is not the sounding field in the header, rather the NDPA payload instructions which identify the receiving stations which are requested to share their channel analysis with the transmitter so as to improve its subsequent communications. FIG. 2D shows such a packet 242 and the corresponding symbol interval (SI) required to transmit each field thereof. The header 242A includes a legacy portion containing the L-STF, L-LTF and L-SIG fields and a very high throughput portion containing the VHT-SIGA, VHT-STF, VHT-LTF and VHT-SIGB fields. The payload portion 242B of a sounding packet contains no user data. The legacy (L), long (LTF) and short (STF) training and signal (SIG) 260 fields are compatible with stations supporting only the IEEE 802.11n or earlier standards. The remaining signal and training fields are intended only for very high throughput, e.g. IEEE 802.11ac compliant devices. The VHT-SIGA field 262 contains information on the modulation and coding scheme (MCS) and number of streams of the sounding. The VHT-STF field 264 is used for automatic gain control (AGC). The VHT-LTF field 266, a.k.a. channel estimation or sounding field, contains a long training sequence used for MIMO channel estimation by the receiver.

All WLAN packets whether associated with communicating a sounding or the communication of user data include a similar header portion with the same training and signal preamble fields with known sequences which allow the receiving station to synchronize reception with packet boundaries and to determine the received channel.

FIG. 3 is a timeline of a MU-MIMO downlink in accordance with an embodiment of the invention incorporating hybrid spatial mapping using both explicit sounding together with crosstalk tracking. The timeline shows a wireless access point (WAP) 300 and associated stations 302A-B of a residential WLAN during various phases of operation associated with an MU-MIMO downlink in an embodiment of the invention where both the WAP and the stations include complementary capabilities to enable hybrid MU-MIMO spatial mapping. These capabilities reduce the frequency of explicit soundings by extending the post sounding interval over which a reliable downlink can be maintained. Each packet in the MU-MIMO downlink has a payload portion which contains distinct blocks of data each destined for a corresponding one of the stations in the MU-MIMO downlink group. The MU-MIMO packet allows transmission of discrete payload data to two or more receiving stations at the same time, thus increasing WLAN throughput. Ideally, each station in the group receives a common MU-MIMO packet header, and its own a distinct block of data. The distinct blocks of data in the MU-MIMO packet payload are said to be spatially mapped during transmission so as to arrive at each corresponding one of the stations, without interference, a.k.a. crosstalk, from the distinct blocks of data destined for other stations in the group. The spatial mapping involves complex signal processing using the multiple antennas of the WAP and a precoding matrix to spatially separate the distinct blocks of data in the MU-MIMO packet payload among the targeted MU-MIMO group of stations. The determination of the precode matrix, requires detailed channel information feedback from each of the targeted stations in response to an explicit sounding. The feedback from each station as to its communication channel with the WAP is aggregated by the WAP and used to determine the precode matrix for transmitting subsequent MU-MIMO downlink packets. The minute changes in the communication channels which would otherwise blur the spatial separation shortly after an explicit sounding are corrected for by using crosstalk feedback from one or more of the targeted stations during the MU-MIMO downlink. This avoids frequent explicit soundings and extends the downlink interval between explicit soundings, e.g. by 500%.

The timeline in FIG. 3 includes an overhead portion including the sounding and feedback phases "A" and "B" respectively of an Explicit sounding over a representative interval, e.g. 10 milliseconds. The explicit sounding is initiated at time to with the sounding transmissions 308 by the WAP 100. The sounding is conducted on a selected one of the communication channels available to the WLAN. The sounding phase is initiated with an NDPA (not shown) which announces the group of target stations selected for the MU-MIMO sounding and subsequent downlink. This announcement packet is followed by an NDP 310. Both the NDPA and the NDP packets are sent using an isotropic RF signal strength 308. Neither the NDPA nor the NDP contains any user data. These packets are explicitly dedicated to soliciting a sounding of the link channel. The header 310A of the NDP contains the VHT-LTF training field which the receiving stations targeted for the MU-MIMO downlink, i.e. stations 302A-B use to characterize the respective link channels $H_a$ and $H_b$. Each receiving station 302A-B determines the respective link channel $H_n$, where "n" is the sub-channel or tone index, for each of the OFDM tones or sub-channels of the selected channel. The group of stations 302A-B targeted for the MU-MIMO downlink will then over the interval $t_1$-$t_2$, send the respective channel feedback packets 314, 312 including in the payload portion thereof, the channel feedback. In an embodiment of the invention the sounding feedback conforms to the IEEE 802.11n standard, where each feedback packet 312, 314 will include the H matrix 312B, 314B respectively for each sub-channel or tone of the corresponding WAP-station sounding. The WAP 300 aggregates this received feedback and determines a precoding matrix "Q" 318A therefrom.

The next portion of the prior art MU-MIMO timeline shown in FIG. 3 is the extended downlink portion including the downlink transmission and receipt acknowledgement phases "C, E" and "D, F" respectively of this hybrid spatially mapped MU-MIMO downlink over a representative extended interval, e.g. 500 milliseconds. The extension of the downlink interval from 90 to 500 milliseconds is made possible because of the crosstalk tracking that takes place during the packet receipt and acknowledgement of the downlink. Initially the precoding matrix "Q" 318A determined from the explicit sounding is starting at time $t_2$, used for spatially mapping the transmitted MU-MIMO packet 324 to the stations 302A-B. The MU-MIMO packet 324 includes a header 324A and a payload portion. The spatial mapping of the payload portion of the MU-MIMO packet 324 allows the distinct block of data for station 302A and the distinct block of data for station 302B to arrive at their respective target stations without crosstalk or interference from the other block of data. The precoding applied by the spatial mapper to the transmitted payload produces the distinctly anisotropic RF signal strength multi-lobe pattern 320A-320B. At time $t_3$ each station has received the first MU-MIMO packet 324. Each station uses the training field in the header thereof, e.g. VHT-LTF to quantify any crosstalk introduced by minute changes in the respective communication channels since the explicit sounding. This crosstalk is quantified by each receiving station in terms of the distinct crosstalk contribution for each of the other stations in the group. Each station 302A-B then acknowledges receipt of the first MU-MIMO packet 324, in an "ACK" packet. In this embodiment of the invention each "ACK" packet includes in a payload portion thereof, the quantified crosstalk as determined by the corresponding station.

At time $t_4$ the WAP aggregates the crosstalk feedback from the received ACK packets and uses that crosstalk feedback to determine incremental adjustments to elements of the precode matrix "Q" in a direction which reduces the amount of crosstalk at the receiving stations. The WAP then spatially maps the next transmitted MU-MIMO downlink communication packet(s) 344 with the adjusted precode matrix "Q'" 318B and the adjusted anisotropic RF signal strength pattern 340A-B. The receiving stations then repeat the process, acknowledging the receipt of the second MU-MIMO downlink packet in ACK packets 350, 352 each of which includes the quantified crosstalk as observed by each of the stations, from remaining stations in the group. The downlink and crosstalk tracking process repeats itself until, for example, the observed packet error rate (PER) exceeds an acceptable threshold limit/level, or the signal-to-interference-plus-noise-ratio (SINR) falls below an acceptable threshold limit/level at which time, another explicit sounding is made. The advantage of this hybrid approach to spatial mapping incorporating both explicit sounding and crosstalk tracking is that only 2 explicit soundings per second, may be required. Thus overhead is dramatically reduced and the downlink portion of MU-MIMO activity is greatly extended, e.g. 500 milliseconds in the example shown in FIG. 3, vs. the prior art case without crosstalk tracking of 90 milliseconds.

In an embodiment of the invention, some of the benefits of crosstalk tracking can be realized even where less than all the stations in a given MU-MIMO downlink group support crosstalk tracking. In still another embodiment of the invention, crosstalk feedback may be carried in other types of uplink packets, with however some corresponding penalty in terms of overall overhead.

FIG. 4A is a graph of communication channel variations as a function of time. MU-MIMO precoding attempts to find a precoding matrix such that transmissions intended for a given user cause no interference for any of the other users included in the MU transmission. For the purposes of the discussion, we can assume that zero-forcing precoding is used to achieve this interference cancellation.

The precoding is based on knowledge of all the channels between the AP and each of the intended receivers. Denote the channel between the AP and user i as $H_i$. If there are $N_u$ users, we have:

$$H_i, i=1, \ldots, N_u \quad (1)$$

where $H_i$ is an $N_{RX,i} \times N_{TX}$ matrix, assuming that the receiver i has $N_{RX,i}$ receive antennas and the AP has $N_{TX}$ transmit antennas. For each of the users, the AP determines a precoding matrix $Q_j$, j=1, ..., $N_u$, such that:

$$H_i Q_j = 0, i \neq j \quad (2)$$

if the number of streams sent to user j is $N_{STS,j}$, $Q_j$ is an $N_{TX} \times N_{STS,j}$ matrix.

If we build a composite channel matrix consisting of all individual channel matrices $H_i$ and a full precoding matrix that has the various $Q_j$ as columns, we find that:

$$\begin{bmatrix} H_1 \\ \vdots \\ H_{N_u} \end{bmatrix} [Q_1 \ \ldots \ Q_{N_u}] = \begin{bmatrix} H_1 Q_1 & 0 & 0 \\ 0 & \ddots & 0 \\ 0 & 0 & H_{N_u} Q_{N_u} \end{bmatrix} \quad (3)$$

The entries $H_i Q_i$ are the effective channels for each of the users i. The zeros in the matrix indicate that there is no interference from any of the other users. Residual interference would manifest itself as non-zero entries for off-diagonal elements. (3) is a (block-)diagonal matrix of dimensions $$\sum_{i=1}^{N_u} N_{RX,i} \times \sum_{j=1}^{N_u} N_{STS,j}.$$

The precoding matrices are determined to meet condition (2). However, that calculation is based on a snapshot in time. The channel information is only really known when the channel is sounded. Any drift in the channel after that is not captured in the precoding matrices as calculated. These changes in channel will ultimately lead to a loss of the orthogonality condition (2) and the emergence of interference within the MU transmission. We will illustrate the effect, and then discuss ways of countering these changes in channel.

First, we need to find a convenient way to model the changes in channel over time. In the description above, the matrix calculation and properties apply to a single tone in an OFDM system. For simplicity, we will continue to express the discussion in matrix framework. In a real OFDM system, every tone can be considered independently. To model the variation in a given channel, we choose an initial value and a final value for the channel matrix and linearly "morph" from the initial to the final channel over a selected period of time. This allows us to assess the quality of precoding for a changing channel. The approach is illustrated in FIG. 4A. The first channel realization is a 1×4 matrix shown on the left by circles. The final channel realization is shown on the right by squares. The lines indicate what the value of the channel is at any intermediate point in time. A similar approach can be used for high-dimensional matrices and complex-valued matrices.

FIG. 4A shows two 1×4 channels and their intermediate realizations as the channel moves from its initial to its final state. Using this approach for changing channels, the simulation tries to mimic the typical behavior of a MU system. Specifically: The system performs a channel sounding at an initial time and derives MU precoding matrices "Q" based on the channel state at this time. These precoding matrices are used for subsequent transmissions, even as the channel changes continuously. At any time, we can calculate the SINR from the knowledge of the channel and the precoding matrix that are in use at that time. The signal strength for user i can be calculated as:

$$S_i = \text{trace}(Q_i^+ H_i^+ H_i Q_i) \quad (4)$$

While the interference experienced by user i can be calculated as:

$$I_i = \sum_{j \in i} \text{trace}(Q_j^+ H_i^+ H_i Q_j) \quad (5)$$

The SINR for user i is then given by:

$$SINR_i = \frac{S_i}{I_i + N_0} \quad (5)$$

where $N_0$ is power of the additive noise. Throughout the simulations, we'll compare the results with "ideal" precoding. With this, we mean a precoding where the precoding matrices are always up to date with the latest channel information. This would be equivalent to performing a sounding right before the transmission of the MU packet. Note that there will still be a small amount of change since there is a small time lag between the sounding and the actual transmission, but it is minimal. The channels used in the simulation are complex-valued Gaussian channels.

FIGS. 4B-D are graphs of communication channel variations as a function of time with and without explicit soundings. FIG. 4B shows a case with three single-antenna users and $N_{TX}=4$. The precoding matrix is calculated at time t=0 and not updated after that. We see a quick drop-off of the SINR as the precoding matrix "ages" and no longer matches the actual channel conditions. FIG. 4B shows the SINR for three users as a function of time when the channel changes continuously. As seen in FIG. 4B, there is a quick drop in SINR as the channel changes away from the initial value that was used to calculate the precoding matrices. After a while, the precoding becomes unusable and the system should switch from MU to SU to maintain performance. FIG. 4B clearly illustrates that the precoding matrix can not be used indefinitely in a changing channel. In practice, this means that the AP has to update the channel information at regular intervals. There are a number of strategies to do so. The first and most basic approach is for the AP to regularly sound the channel and re-calculate the precoding matrices based on the latest channel information.

FIG. 4C shows the SINR of the three users for a case where the AP sounds the channel ever 100 msec. FIG. 4C shows the SINR for three users as a function of time when the AP periodically sounds the channel. This approach of periodic sounding improves the situation, but there can still be drops of about 10 dB relative to the "Ideal" SINR. Note that right after every sounding, the SINR jumps back to the "ideal" precoding, as expected. The performance goes down steadily after that however, leading to a saw-tooth behavior of the SINR over time.

Different propagation environments may need different sounding intervals for good performance, so it's hard to find a single sounding interval for all environments. A compromise value may be too long for some environments and too short for others. In both cases, this results in a loss in performance compared to an ideal sounding frequency. Instead of sounding at a regular interval, the AP could also use a threshold on the allowed degradation of the original SINR (i.e. relative to the original channel and precoding matrix).

FIG. 4D shows a situation where the channel information is refreshed when the performance of any one of the users has degraded by more than 3 dB. FIG. 4D shows the SINR for three users as a function of time when the AP sounds the channel based on observed SINR degradation. FIG. 4C shows that it is possible with the current sounding protocol to keep the degradation to within a given range, but at the expense of very frequent channel sounding. Each channel sounding represents protocol overhead that reduces the effective throughput.

Another question is how the AP can learn about EVM degradation at the receiver, since this is not something that can be directly observed. Note however that the receiver has a direct view of the level of interference suppression. The current channel estimation protocol in e.g. IEEE 802.11ac allows each receiver to estimate the channels between each stream to its receive antennas, including channels that correspond to streams intended for other users. If (2) is true, the estimated channels for these "other" streams should be zero. If the precoding is no longer perfectly orthogonal to the actual channel, the receiver can explicitly estimate the values of $H_iQ_j$. If each receiver provides an indication of these values to the transmitter, the AP can effectively determine the right time to sound based on a more accurate picture of how the precoding is performing. Note that rate adaptation alone may not be able to provide such an accurate picture, since even the performance under "ideal" precoding is a function of time. Simply observing a degradation in performance is not necessarily an indication that the precoding is no longer adequate. The feedback from the receiver could take a number of different forms: We might consider full channel information of $H_iQ_j$. The information can quantized in some form, since we expect the number to be relatively small. The information could be provided on a subset of the tones, since we expect similar behavior on adjacent tones. The information could simply exist of a binary indication that some threshold has been exceeded. Each of these would provide useful guidance to the AP in determining the right time to refresh channel information. It would avoid situations where the sounding is either too fast or too slow and thereby minimize protocol overhead, leading to more optimal throughput numbers.

FIG. 4E is a graph of explicit sounding overhead as a function of modulation and code schema (MCS) used to transmit sounding feedback. FIG. 4E shows representative results for an 8×8 WAP regularly sounding 6 4×4 stations on all tones across an 80 MHz channel. This represent the total airtime needed per sounding. FIG. 4E shows, it is possible to keep the SINR degradation within a desired range through a combination of receiver feedback and frequent channel sounding. The number of soundings required to keep the degradation to within 3 dB is very high however (about 30 in the example shown in FIG. 4D).

In this section, we explore a different approach to keeping the precoding matrix "Q" more closely matched to the actual channel—even if it was originally calculated on a different initial channel. The approach does not consist of sounding and re-calculating the precoding matrix. Instead, we make small incremental changes directly to the precoding matrix, without even having full information about the channel change. Let's denote to composite channel consisting of all individual channels as:

$$\overline{H} = \begin{bmatrix} H_1 \\ \vdots \\ H_{N_u} \end{bmatrix} \quad (6)$$

The channel matrix $\overline{H}$ is the one used to determine the initial precoding coefficients. However, the channel $\overline{H}$ will likely change over the time period in which frames are being sent with this particular precoding matrix. Changes will be gradual over time, so we can express the change as follows:

$$\begin{bmatrix} H_1 \\ \vdots \\ H_{N_u} \end{bmatrix} \rightarrow \begin{bmatrix} \tilde{H}_1 \\ \vdots \\ \tilde{H}_{N_u} \end{bmatrix} = \begin{bmatrix} H_1 \\ \vdots \\ H_{N_u} \end{bmatrix} + \varepsilon \begin{bmatrix} \Delta H_1 \\ \vdots \\ \Delta H_{N_u} \end{bmatrix} \quad (7)$$

i.e. $H_i$ changes to $\tilde{H}_i$, but the change is small when the time between the original measurement and the time the packet is sent is small enough. This is reflected in the assumption that E is a small value.

With this change, the matrix (3), which contains all direct and all interference channels changes from (3) to:

$$\begin{bmatrix} \tilde{H}_1 \\ \vdots \\ \tilde{H}_{N_u} \end{bmatrix} [Q_1 \ldots Q_{N_u}] = \begin{bmatrix} \tilde{H}_1 Q_1 & \tilde{H}_1 Q_2 & \ldots & \tilde{H}_1 Q_{N_u} \\ \tilde{H}_2 Q_1 & \tilde{H}_2 Q_2 & \ldots & \tilde{H}_2 Q_{N_u} \\ \vdots & \vdots & \ddots & \vdots \\ \tilde{H}_{N_u} Q_1 & \tilde{H}_{N_u} Q_2 & \ldots & \tilde{H}_{N_u} Q_{N_u} \end{bmatrix} \quad (8)$$

In this case, in general: $\tilde{H}_i Q_j \ast 0$, for $i \neq j$, and $\tilde{H}_i Q_j = \varepsilon \Delta H_i Q_j$. This can be written as:

$$\begin{bmatrix} \tilde{H}_1 \\ \vdots \\ \tilde{H}_{N_u} \end{bmatrix} [Q_1 \ldots Q_{N_u}] = \quad (9)$$

$$\underbrace{\begin{bmatrix} \tilde{H}_1 Q_1 & 0 & 0 \\ 0 & \ddots & 0 \\ 0 & 0 & \tilde{H}_{N_u} Q_{N_u} \end{bmatrix}}_{diagonal} + \underbrace{\varepsilon \begin{bmatrix} 0 & \Delta H_1 Q_2 & \ldots & \Delta H_1 Q_{N_u} \\ \Delta H_2 Q_1 & 0 & & \Delta H_2 Q_{N_u} \\ \vdots & & \ddots & \\ \Delta H_{N_u} Q_1 & \Delta H_{N_u} Q_2 & & 0 \end{bmatrix}}_{zero\ on\ diagonal}$$

Non-diagonal elements in the second term represent unwanted interference. Note that the direct channels in the first term (diagonal matrix) have also changed with an unknown amount. As we discussed earlier, at receiver "j", the channel from all streams to the receive antennas of receiver j can be measured during VHT-LTF (for the case of 11ac). This means that this receiver has direct knowledge of all $\varepsilon \Delta H_i Q_j$, $i \neq j$. Let's assume that this information can be conveyed (with some delay, obviously) to the transmitter. When it receives the information from all receivers, the transmitter knows the full second term in the right-had side of expression (9).

The goal is now to determine an update to the precoding matrix that can counteract the change in the channel, such that interference cancellation is maintained or improved. Given that the changes in channel are assumed to be small (of order $\varepsilon$), we can look for a correction to the precoding matrix that is of the same order, i.e. $Q_j$ changes to $\tilde{Q}_j$ as follows:

$$[Q_1 \ldots Q_{N_u}] \rightarrow [\tilde{Q}_1 \ldots \tilde{Q}_{N_u}] + \varepsilon [\Delta Q_1 \ldots \Delta Q_{N_u}] \quad (10)$$

If this change of precoding matrix is applied to the changed channel, we get:

$$\begin{bmatrix} \tilde{H}_1 \\ \vdots \\ \tilde{H}_{N_u} \end{bmatrix} [Q_1 \ldots Q_{N_u}] = \begin{bmatrix} \tilde{H}_1 Q_1 & 0 & 0 \\ 0 & \ddots & 0 \\ 0 & 0 & \tilde{H}_{N_u} Q_{N_u} \end{bmatrix} + \quad (11)$$

$$\varepsilon \begin{bmatrix} 0 & \Delta H_1 Q_2 & \ldots & \Delta H_1 Q_{N_u} \\ \Delta H_2 Q_1 & 0 & & \Delta H_2 Q_{N_u} \\ \vdots & & \ddots & \\ \Delta H_{N_u} Q_1 & \Delta H_{N_u} Q_2 & & 0 \end{bmatrix} +$$

$$\varepsilon \begin{bmatrix} H_1 \\ \vdots \\ H_{N_u} \end{bmatrix} [\Delta Q_1 \ldots \Delta Q_{N_u}] + \theta(\varepsilon^2)$$

In the expression (11), we ignore terms of order $\varepsilon^2$, since they are at least an order of magnitude smaller than the interference we are trying to cancel. We now can choose the correction to the precoding matrix, such that terms of order E are eliminated. In other words, we have to solve the following equations for unknowns $\Delta Q_j$:

$$\varepsilon \begin{bmatrix} 0 & \Delta H_1 Q_2 & \ldots & \Delta H_1 Q_{N_u} \\ \Delta H_2 Q_1 & 0 & & \Delta H_2 Q_{N_u} \\ \vdots & & \ddots & \\ \Delta H_{N_u} Q_1 & \Delta H_{N_u} Q_2 & & 0 \end{bmatrix} + \quad (12)$$

$$\varepsilon \begin{bmatrix} H_1 \\ \vdots \\ H_{N_u} \end{bmatrix} [\Delta Q_1 \ldots \Delta Q_{N_u}] = 0$$

Let's denote:

$$M_I = \varepsilon \begin{bmatrix} 0 & \Delta H_1 Q_2 & \ldots & \Delta H_1 Q_{N_u} \\ \Delta H_2 Q_1 & 0 & & \Delta H_2 Q_{N_u} \\ \vdots & & \ddots & \\ \Delta H_{N_u} Q_1 & \Delta H_{N_u} Q_2 & & 0 \end{bmatrix} \quad (13)$$

With (6) and (13), a solution for $\Delta Q_j$, i.e. the adjustments to the precode matrix can be expressed as:

$$\varepsilon [\Delta Q_1 \ldots \Delta Q_{N_u}] = -\overline{H}^+ (\overline{H}\overline{H}^+)^{-1} M_I \quad (14)$$

where $-\overline{H}^+ (\overline{H}\overline{H}^+)^{-1}$ is identified as the pseudo inverse of the aggregate channel and $M_1$ is identified as the interference or crosstalk matrix. We can make some important observations about this solution: The solution only depends on prior channel information, i.e. the channel $\overline{H}$ as it was during the latest sounding. There is no need to know the updated channel (as in (7)). This matrix can be stored and reused until the next sounding. The crosstalk matrix $M_1$ consists entirely of the interference channels as measured at the respective receivers. This information is already implicitly available in the current 11ac training sequence. The only new requirement is that this information has to be communicated back to the MU transmitter.

Once the incremental adjustments to the precode matrix have been determined (14), by calculating the product of the pseudo channel inverse of the aggregate channel and the crosstalk matrix, the adjusted precode matrix "Q'" can simply be calculated by adding the incremental adjustments to the prior precode matrix as follows:

$$[Q_1 \ldots Q_{N_u}] \rightarrow [\tilde{Q}_1 \ldots \tilde{Q}_{N_u}] + \varepsilon [\Delta Q_1 \ldots \Delta Q_{N_u}]$$

Using this adjusted precode matrix "Q'" for spatial mapping of subsequently transmitted MU-MIMO downlink packets will reduce the crosstalk/interference from a magnitude of $\theta(\varepsilon)$ to a magnitude of $\theta(\varepsilon^2)$. In dB scale, it will double the signal-to-interference ratio (e.g. 20 dB goes to 40 dB). Below, we show some results that use this updated precoding matrix approach.

FIGS. 4F-G are graphs of communication channel variations as a function of time with the hybrid spatial mapping of an embodiment of the invention. FIG. 4F shows the SINR of three users when the precoding matrix is updated based on observed interference channels at the respective receivers. FIG. 4F shows the case where the channel sounding and precoding calculation are performed at time t=0. There is no further sounding after that, exactly as it was in FIG. 4B. However, the precoding matrix is updated as explained in the previous section, based on feedback from the iriterterence channels (13) measured at the receiver. FIG. 4F should be compared with FIG. 4B. The precoding matrices keep their cancellation properties for a much longer time. Even if there is increased degradation towards the end, the performance never collapses as it does in FIG. 4B. The degradation in FIG. 4F does however sometimes exceeds 3 dB, so we could supplement the updating of the precoding matrix with an occasional sounding. If we set the same 3 dB threshold, we get the picture as shown in FIG. 4G.

FIG. 4G shows the SINR of three users when the precoding matrix is updated based on observed interference channels at the respective receivers, supplemented with an explicit sounding. FIG. 4G shows that the sounding can be substantially reduced when the precoding matrix can be kept more up-to-date with other means. In FIG. 4G, a single sounding is needed to keep the degradation to within 3 dB for the whole duration. In the equivalent FIG. 4D, about 30 soundings are needed to achieve the same. And even then, the SINR in FIG. 4D shows an undesirable "saw-tooth" behavior, while the SINR in FIG. 4G is much smoother as a function of time. The approach of updating the precoding matrices based on crosstalk/interference channels measured at the receiver shows a lot of promise as an alternative to frequent sounding. It may not replace explicit sounding, but when used in combination with explicit sounding it will significantly reduce the needs for explicit channel sounding.

The purpose of hybrid spatial mapping using a mix of explicit sounding and crosstalk tracking is to reduce the protocol overhead that is associated with sounding. Sending such crosstalk feedback in the ubiquitous "ACK" packets is one way of achieving this objective. Additionally, the feedback format for the extra information should be kept sufficiently small. Since we expect the numbers to be typically small, the number of bits required to communicate the information may be limited. In addition, further reduction may be obtained by grouping tones. The analysis presented here applies to a single tone. In an OFDM system, the method can be applied to each tone individually. We have to be mindful of the fact that from one transmission to the next, the tones could show a phase shift if e.g. symbol alignment is not exactly the same. The feedback protocol needs a way to encode information in a way that allows the AP to normalize the received information back to a reference phase. The analysis presented here uses full channel "H" information. To keep MU-precoding up to date under changing channel conditions, the precoding matrices need to be kept sufficiently up to date. One approach is to regularly sound the channel to refresh the channel information and the precoding matrices derived from it. This can be done autonomously by the WAP, or the WAP can receive supporting information from the respective receivers that can help its decision in when to refresh the channel information. Information provided by the receivers can be based on reported crosstalk/interference measurements.

In another embodiment of the invention the crosstalk feedback is used to directly update the precoding coefficient without explicit sounding information. The updates are applied as successive corrections to the precoding matrix. The updates are a function of crosstalk/interference channel measurements as observed at the various receivers.

Figure 5:
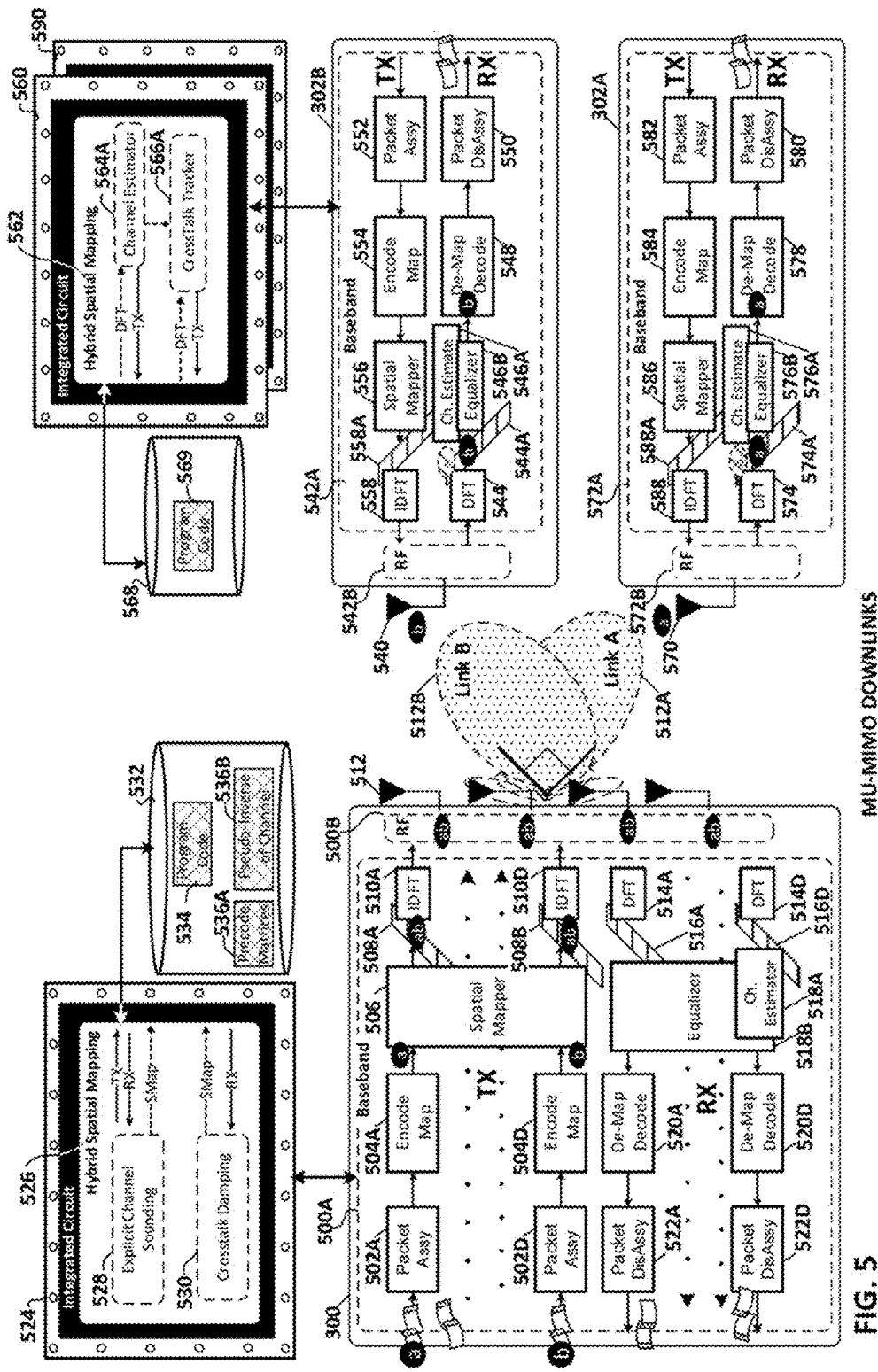
FIG. 5 is a hardware block diagram of a WAP and two stations configured to support the hybrid spatial mapping for MU-MIMO downlinks of an embodiment of the current invention.

FIG. 5 is a hardware block diagram of a WAP 300 and two stations 302A B configured to support the hybrid spatial mapping for MU-MIMO downlinks of an embodiment of the current invention. The WAP is shown with a plurality of shared and discrete hardware components coupled together to form four transmit and receive chains for MIMO communications over an array of antenna 512. The WAP includes an integrated circuit 524 hardware component which interfaces with the other transmit and receive path hardware components to provide the WAP's hybrid spatial mapping capability in accordance with an embodiment of the invention. The WAP supports discrete communications with a station or concurrent MU-MIMO communications with a group of targeted stations. The WAP in this embodiment of the invention is identified as a 4×4 WAP supporting as many as 4 discrete communication streams "a", "b", "c", "d" over its array of four antennas 512. The WAP includes: a WLAN stage including base band components 500A and radio frequency (RF) components 500B coupled to the MIMO antenna array 512. The WAP supports one or more IEEE 802.11 wireless local area network (WLAN) protocols.

WAP transmission begins in the baseband stage 500A where outgoing communications for associated users/stations singly or in multi-user groups are subject to baseband transmit processing. The baseband components are configurable to conform with the number of communication data streams to be transmitted, which in the example shown is from one-to-four. The WAP is capable of transmitting up to four separate streams of data concurrently. The data is packetized in up to four packet assemblers 502A-D; encoded for error correction, scrambled, interleaved, and mapped to the appropriate constellation points in up to four encoder mappers 504A-D, and sent to the spatial mapper 506 for spatial mapping using a precode matrix. In the example shown two streams of discrete data are subject to baseband processing. Stream "a" destined for station 302A and stream "b" destined for station 302B. The spatially mapped streams "ab" are output by the spatial mapper onto the OFDM tone/sub-channel bins 508A-D at the input of each of the four inverse discrete Fourier transform (IDFT) components 510A-D which transform the outgoing communications from the frequency to the time domain. There is a discrete precoding matrix for each of the OFDM tones or sub-channels. The outgoing communication data is then passed to the RF stage 500B for upconversion to the appropriate communication channel and transmission by the four antenna array 512. The spatial mapping using a precode matrix derived from a prior isotropic explicit sounding of the stations, has the effect of spatially separating the distinct "ab" streams transmitted by the WAP so that upon arrival at stations 302A and 302B the "a" stream portion of the "ab" transmission arrives at station 302A without crosstalk/interference from the "b" stream, and conversely the "b" stream portion of the "ab" transmission arrives at station 302B without crosstalk/interference from the "a" stream. This spatial separation is graphically represented by the multi lobed RF signal strength pattern 512A-B output by the MIMO antenna array 512. The complex signal processing responsible for this result quickly looses its effectiveness as slight and normally occurring changes in the multi-path communication channel between the WAP and each station take place. The hybrid spatial mapping capability of the WAP and stations allows post sounding adjustments to the precode matrix which reduce the severity of this problem, by using crosstalk feedback during downlink transmissions to incrementally adjust the precode matrix used for spatial mapping.

WAP reception begins in the RF Stage 500B where uplink communications from one of the stations are received on each of the four antenna 512. These received communications are downconverted and supplied as input to the baseband stage 500A. In the baseband stage the received communications are then transformed from the time to the frequency domain in the discrete Fourier Transform (DFT) modules 514A-D from which they are output as discrete orthogonal frequency division multiplexed (OFDM) tones/sub-carriers/sub-channels 516A-D. The header portion of each received uplink packet, and specifically the training field therein, e.g. the VHT-LTF field, is used by the channel estimator 518A to estimate the frequency dependent distortions in the uplink channel and the updated channel information is passed to the equalizer 518B to cancel out any frequency dependent group or phase delay between the received OFDM tones/subchannels. The received communication streams are then demapped from constellation points to bits, deinterleaved, descrambled and decoded in the corresponding one of up to four demapper decoders 520A-D and then passed to the corresponding one of up to four packet disassemblers 522A-D, which output the received uplink communication.

WAP hybrid spatial mapping is controlled by an integral integrated circuit 524, and specifically the hybrid spatial mapping circuitry 526 thereof which is coupled to the above discussed transmit and receive path components of the WAP. The explicit channel sounding circuit 528 controls the transmission of sounding packets initialized by the packet assemblers 502A-D and the receipt of explicit sounding feedback from the packet disassemblers 522A-D. The explicit sounding circuit calculates the precoding matrix from the explicit sounding feedback and injects that matrix into the spatial mapper 506 for spatially mapping single or multi-user downlink transmissions. For MU-MIMO downlinks, the explicit channel sounding circuit determines from the received communication channel feedback, a MU-MIMO precode matrix "Q" for spatially mapping the transmission of discrete portions of a payload of the MU-MIMO downlink communication packet for crosstalk-free reception at each of the group of the associated stations, e.g. stations 302A-B, targeted by the MU-MIMO downlink. The crosstalk damping circuit 530 receives crosstalk feedback from one or more of the stations in the MU-MIMO downlink group via its coupling with the packet disassemblers 522A-D. It determines any incremental adjustments to the precode matrix on the basis of the crosstalk feedback. Any adjustments of elements to the precode matrix are in a direction which reduces the amount of crosstalk at the receiving stations. The adjusted precode matrix is then input to the spatial mapper 506 for spatially mapping subsequently transmitted MU-MIMO downlink communication packets with the adjusted precode matrix thereby improving downlink communications between explicit soundings.

In an embodiment of the invention the hybrid spatial mapping circuit may include a mix of both dedicated and programmable hardware circuit components. These embodiments of the invention may include a non-volatile memory 532 in which any one or all of: program code 534, precode matrices 536A, and pseudo inverse aggregate channel matrices may be stored. The program code operable on any such programmable portions of the hardware circuit to perform one or more of the discussed functions associated with either or both the explicit channel sounding and crosstalk damping circuits.

Stations eligible for an MU-MIMO downlink may have from one or more antennas. In the example shown the stations each have only one antenna, though that need not be the case. Station reception in station 302A begins in the RF Stage 572B where downlink communications from the WAP are received on the antenna 570. These received communications are downconverted and supplied as input to the baseband stage 572A. In the baseband stage the received communications are then transformed from the time to the frequency domain in the DFT module 574 from which they are output as discrete orthogonal frequency division multiplexed (OFDM) tones/sub-carriers/sub-channels 574A. The header portion of each received downlink packet, and specifically the training field therein, e.g. the VHT-LTF field, is used by the channel estimator 576A to estimate the frequency dependent distortions in the downlink channel and the updated channel information is passed to the equalizer 576B to remove phase and amplitude distortions caused by the channel. The received communication stream is then demapped from constellation points to bits, deinterleaved, descrambled and decoded in the demapper decoder 578 and then passed to the packet disassembler 580, which outputs the received uplink communication.

Station 302B is also a single antenna single stream device, though this need not be the case. It could for example have an array of antenna, and MIMO multi-stream transmit and receive capability and as such participate as an MU-MIMO downlink target with station 302A. Station reception in station 302B begins in the RF Stage 542B where downlink communications from the WAP are received on the antenna 540. These received communications are downconverted and supplied as input to the baseband stage 542A. In the baseband stage the received communications are then transformed to the frequency domain in the DFT module 544 from which they are output as discrete OFDM tones 544A. The header portion of each received downlink packet is used by the channel estimator 546A to estimate the frequency dependent distortions in the downlink channel and the updated channel information is passed to the equalizer 546B to equalize the received OFDM tones. The received communication stream is then demapped, deinterleaved, descrambled and decoded in the demapper decoder 548 and then passed to the packet disassembler 550, which outputs the received uplink communication.

Station transmission of station 302A begins in the baseband stage 572A where outgoing uplink communications to the WAP are subject to baseband transmit processing. The station transmits a single stream of data. The data is packetized in the packet assembler 582; encoded for error correction, scrambled, interleaved, and mapped to the appropriate constellation points in the encoder mapper 584, and sent to the spatial mapper 586 for any spatial mapping. In the instant example, where the station has only one antenna no spatial mapping is possible. The outgoing communication stream is then passed onto the OFDM tone/sub-channel bins 588A at the input of the IDFT component 588 which transform the outgoing communications from the frequency to the time domain. The outgoing communication data is then passed to the RF stage 572B for upconversion to the appropriate communication channel and transmission by the antenna 570.

Station transmission of station 302B begins in the baseband stage 542A where outgoing uplink communications to the WAP are subject to baseband transmit processing. The station transmits a single stream of data. The data is packetized in the packet assembler 552; encoded, scrambled, interleaved, and mapped to the appropriate constellation points in the encoder mapper 554, and sent to the spatial mapper 556 for any spatial mapping. In the instant example, where the station has only one antenna no spatial mapping is possible. The outgoing communication stream is then passed onto the OFDM tone/sub-channel bins 558A at the input of the IDFT component 558 which transform the outgoing communications from the frequency to the time domain. The outgoing communication data is then passed to the RF stage 542B for upconversion to the appropriate communication channel and transmission by the antenna 540.

Hybrid spatial mapping feedback operations for station 302B are controlled by an integral integrated circuit 560. Hybrid spatial mapping feedback for station 302A is controlled by an integral integrated circuit 590. The integral integrated circuit 560 for station 302B will be discussed in detail, and is functionally similar to the circuitry (not shown) for the other station. The hybrid spatial mapping feedback circuitry 562 is coupled to the above discussed transmit and receive path components of the station 302B. The channel estimation circuit 564A is coupled to the channel estimator 546A and is responsive to an explicit sounding received from the WAP to determine a communication channel associated therewith and to transmit feedback to the WAP as to the determined communication channel via the packet assembly component 552 in a sounding feedback packet. The crosstalk tracker circuit 564A is also coupled to the channel estimator 546A and is responsive to the training field, e.g. the VHT-LTF field, in a received downlink MU-MIMO packet received from the WAP to determine the quantity of crosstalk in said packet from portions of the downlink MU-MIMO packet payload destined for other stations in the MU-MIMO group and to transmit feedback to the WAP as to the determined crosstalk via the packet assembly component 552 in for example the payload of an "ACK" packet, which both acknowledges receipt of the MU-MIMO downlink and quantifies the amount of crosstalk if any, in the received MU-MIMO packet.

In an embodiment of the invention the hybrid spatial mapping feedback circuit may include a mix of both dedicated and programmable hardware circuit components. These embodiments of the invention may include a non-volatile memory 568 in which program code 569 may be stored. The program code is operable on any such programmable portions of the hardware circuit to perform one or more of the discussed functions associated with either or both the channel estimation or crosstalk tracking circuits.

Figure 6:
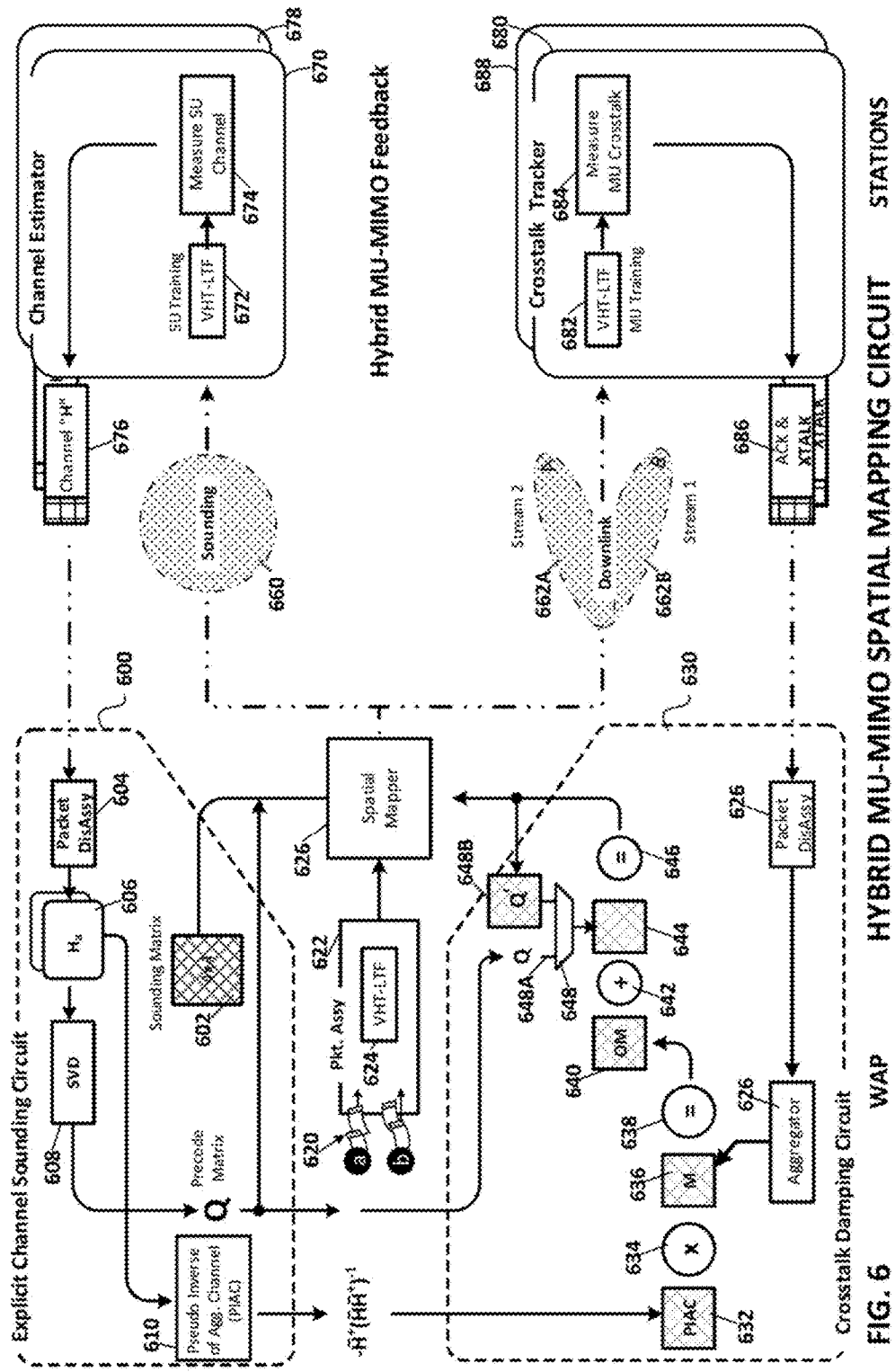
FIG. 6 is a detailed circuit diagram of hybrid spatial mapping circuits in the WAP and Stations as shown in FIG. 5, in accordance with an embodiment of the current invention.

FIG. 6 is a detailed circuit diagram of hybrid spatial mapping circuits in the WAP and Stations as shown in FIG. 5, in accordance with an embodiment of the current invention. On the WAP an embodiment of the hybrid explicit channel sounding and crosstalk damping circuits 600, 630 respectively are shown. On the targeted downlink stations an embodiment of the hybrid MU-MIMO feedback circuits, specifically the channel estimation and crosstalk tracking circuits 670/678 and 680/688 respectively are shown.

On the WAP the explicit channel sounding circuit 600 initializes an explicit channel sounding by assembling a NDP sounding packet including the training field, e.g. VHT-LTF 624 in the packet assembler 622 and spatially maps the training field using a sounding matrix 602 as input to the spatial mapper 626. The sounding packet is transmitted, with generally isotropic RF signal strength 660, by the MIMO antenna array (not shown) to the two or more receiving stations in the MU-MIMO group.

On each receiving station the integral channel estimator circuit, e.g. channel estimator 670 determines the communication channel 674 associated with the received VHT-LTF or other training field 672 of the explicit sounding and transmits a sounding feedback packet 676 to the WAP's explicit channel sounding circuit 600 of the channel information derived from the sounding.

On the WAP, the packet disassembler 604 of the explicit channel sounding circuit 600 unpacks the channel information 606 from all the feedback packets from the stations in the MU-MIMO group. Then the WAP performs two calculations. The first calculation is the determination of a precode matrix "Q" for the spatial mapping the MU-MIMO downlink communication packet. That calculation may involve a singular value decomposition (SVD) 608 of the aggregated channel feedback 606 to determine the precode matrix "Q". The second calculation is the determination of the pseudo inverse of the aggregate channels (PIAC) 610. The explicit channel sounding circuit initiates the transmission of the downlink transmission by assembling in the packet assembler 622 the MU-MIMO downlink packet including the VHT-LTF training field as well as the discrete "a" and "b" streams of data 620 in the payload of the MU-MIMO packet. The MU-MIMO packet including the training and payload fields is then spatially mapped with the precode matrix "Q" in the spatial mapper 626 and transmitted by the WAP's MIMO antenna array (not shown) to the downlink stations. The downlink MU-MIMO packet transmission exhibits an anisotropic RF signal strength profile 662A-B so that the distinct "a" and "b" portions of each downlink packet are each received at the corresponding one of the stations without interference/crosstalk from the portions destined for other stations in the MU-MIMO group. The explicit channel sounding circuit also outputs the precode matrix "Q" and PIAC to the crosstalk damping circuit 630.

On each receiving station the integral crosstalk tracker circuit e.g. crosstalk tracker 680 determines the amount of any crosstalk in the received packet and specifically in the VHT-LTF or other training field 682. Crosstalk is quantized on a per station, e.g. per stream, basis as to the portions of the packet destined for remaining stations in the MU-MIMO group. The quantized crosstalk is then transmitted by the crosstalk tracker 680 back to the WAP in a feedback packet 686, which in an embodiment of the invention is the "ACK" packet used to acknowledge receipt of the packet.

On the WAP the crosstalk damping circuit 630 and specifically the packet disassembler 626 thereof unpacks the received packet and passes the crosstalk feedback therein, to the aggregator 626. The aggregator populates the appropriate ones of the off diagonal elements of the interference matrix "M" 636 with the corresponding elements of the crosstalk feedback aggregated from one or more of the targeted station s in the MU-MIMO group. The crosstalk damping circuit then obtains the product 634 of the PIAC 632 obtained from by the explicit channel sounding circuit and the interference matrix 636 and passes the resultant 638 offset matrix 640 to the next circuit stage. The offset matrix containing the incremental adjustments to the precode matrix is then added 642 to either the initially determined precode matrix "Q" or to some subsequently derived variation thereof as determined by the multiplexer 648. The multiplexer has two inputs 648A-B with the "A" input associated with the initial precode matrix "Q" and the "B" input associated with subsequent adjustments to same, e.g.

"Q'", "Q''", "Q'''", "Q''''" etc. The multiplexer is reset to the "A" input after each explicit sounding and is otherwise on the "B" input. The output of the multiplexer is coupled to the prior precode matrix register 644 the contents of which are added 642 to the contents of the offset matrix register 640. The sum 646 represents the adjusted precode matrix which is input to the spatial mapper for spatially mapping subsequent downlink MU-MIMO packet transmissions, until such time as on the basis of for example PER or SINR another explicit sounding takes place.

Figure 7:
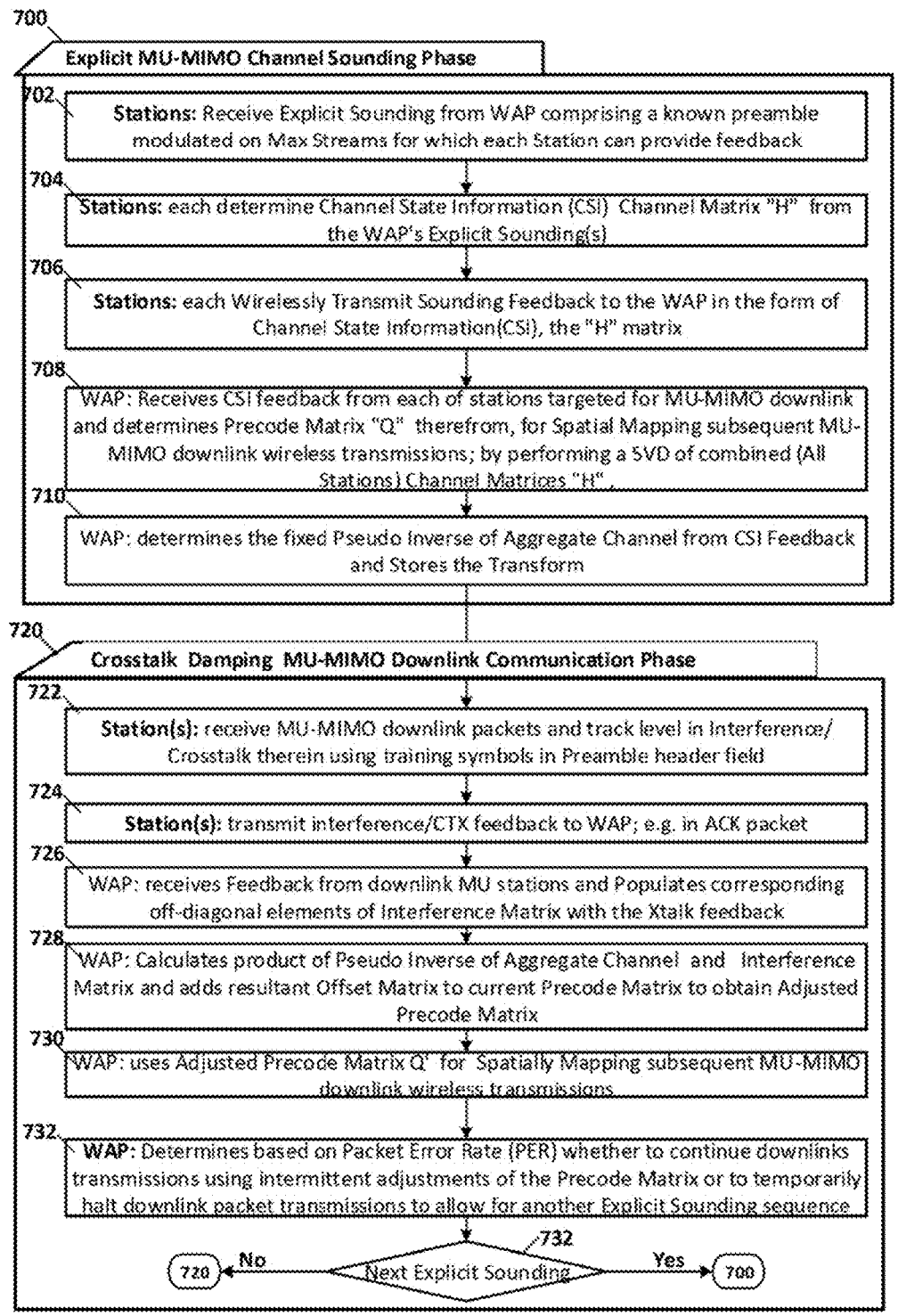
FIG. 7 is a process flow diagram of processes associated with hybrid spatial mapping for MU-MIMO downlinks on both the WAP and stations in accordance with an embodiment of the invention.

FIG. 7 is a process flow diagram of processes associated with hybrid spatial mapping for MU-MIMO downlinks on both the WAP and stations in accordance with an embodiment of the invention. Processing begins with the block of processes 700 associated with the Explicit MU-MIMO channel sounding phase. In the initial process 702 the group of stations selected for an MU-MIMO downlink receive an explicit sounding from the WAP which comprises a known preamble modulated on the maximum Lumber of streams from which each station can provide feedback. The sounding comprises a known training sequence modulated on the training field, e.g. the VHT-LTF held, of the sounding packet, e.g. the NDP packet. Then in process 704 the stations each use the training field to determine the channel state information (CSI), i.e. the respective link channels with the WAP. Next in process 706 each station wirelessly transmits the sounding feedback to the WAP in the form of the respective "H" matrices. In process 708 the WAP receives the CSI sounding feedback from each of the stations targeted for the MU-MIMO downlink. The WAP determines the precode matrix "Q" from the sounding feedback. The determination of the precode matrix may be made by performing a singular value decomposition (SVD) of the combined channel matrices "H". The precode matrix "Q" is then used to spatially map subsequent. MU-MIMO downlink wireless transmissions. The WAP also in process 710 determines the pseudo inverse of the channel matrix, i.e. $-\overline{H}^+(\overline{HH}^+)^{-1}$ from the feedback and stores the transform for use during the next phase of hybrid spatial mapping which occurs during the downlink wireless transmissions.

The second block of processes 720 is associated with crosstalk damping during the MU-MIMO downlink communication phase. In the initial process 722 the stations receive the MU-MIMO downlink packets and track the level of Crosstalk/interference from the portion of the MU-MIMO packet, i.e. the stream or streams destined for each of the other stations in the MU-MIMO group. Each station uses the training symbols in the preamble header field, e.g. the VHT-LTF field in the MU-MIMO downlink packet which contains known or pre-defined: modulation, number of streams, and bit sequence to analyze changes thereto brought about by the link channel, e.g. fading, attenuation, and phase shift, and uses this information to demodulate the downlink MU-MIMO packet. Additionally, each receiving station uses this training field to quantify the crosstalk from the portions of the MU-MIMO packet, i.e. the streams destined for other stations in the group. Then in process 724 the crosstalk information is transmitted back, as crosstalk feedback to the WAR In an embodiment of the invention, the feedback is included in the payload portion of the ubiquitous "ACK" packet which each station uses after receipt of one or more downlink packets to acknowledge to the WAP the receipt of those packets. The WAP in process 726 receive the feedback from one or more of the downlink MU-MIMO stations and populates corresponding off-diagonal elements of the interference Matrix "M" with the crosstalk feedback information. Then in process 728 the WAP calculates the product of the pseudo inverse of the aggregate channel and the Interference matrix and adds the resultant offset matrix to the current precode matrix to obtain the adjusted precode matrix "Q'". The WAP then in process 730 uses the adjusted precode matrix to spatially map subsequently transmitted MU-MIMO downlink packets. Next the WAP determines some measures of downlink efficiency or throughput, e.g. packet error rate (PER) or signal-to-interference-plus-noise-ratio (SINR). Then in decision process 732 a determination is made as to whether or not to continue downlink transmissions using intermittent adjustments of the precode matrix or to temporarily halt downlink packet transmissions to allow for another explicit sounding sequence. If packet error rate (PER) rises above a threshold level, or signal-to-interference-plus-noise-ratio (SINR) for the downlink MU-MIMO communication packets falls below a threshold level control may return to process block 700 for the next explicit sounding. Alternately, if PER and or SINR are still at acceptable levels control may return to the crosstalk damping block of processes 720 which are repeated thereby extending the interval between explicit soundings. In this latter case, the resultant offset matrix in process 728 is added to the current precode matrix, e.g. "Q'" to obtain the twice adjusted precode matrix, e.g. "Q''".

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) having a plurality of antennas and supporting a wireless local area network (WLAN) including multiple-input multiple-output (MIMO) communications with associated stations on a selected communication channel, the WAP comprising:
   hardware processing circuitry to perform hybrid spatial mapping operations for multi-user (MU) MIMO downlinks including:
      an explicit channel sounding circuit for sounding targeted stations among the associated stations for a multi-user (MI) MIMO downlink and for determining from explicit sounding feedback received from said targeted stations both precode matrix "Q" for spatially mapping the MU-MIMO downlink and a "P1AC" matrix corresponding to a pseudo inverse of an aggregate channel between the WAP and the targeted stations; and
      a crosstalk damping circuit responsive to crosstalk feedback received from the targeted stations to combine the P1AC matrix with the received crosstalk feedback into an offset matrix and to spatially map subsequent MU-MIMO downlinks with an adjusted precode matrix "Q" de rived by combining the offset matrix with the precode matrix "Q" to improve the MU-MIMO downlink between explicit soundings.

2. The WAP of claim 1, wherein the crosstalk damping circuit receives the crosstalk feedback in acknowledgment (ACK) packets from the targeted stations to avoid interruption of the MU-MIMO downlink.

3. The WAP of claim 1, wherein the P1AC matrix determined by the explicit channel sounding circuit corresponds to: $-\overline{H}^+(\overline{H}\overline{H}^+)^{-1}$ where $\overline{H}$ is a channel matrix.

4. A method for operating a wireless access point (WAP) having a plurality of antennas and supporting a wireless local area network (WLAN) including multiple-input multiple-output (MIMO) communications with associated stations on a selected communication channel, the method comprising acts of:

explicitly sounding targeted stations among the associated stations for a multi-user (MU) MIMO downlink;

determining from explicit sounding feedback received from said targeted stations both a precode matrix "Q" for spatially mapping the MU MIMO downlink and a "P1AC" matrix corresponding to a pseudo inverse of an aggregate channel between the WAP and targeted stations;

transmitting MU-MIMO downlink packets to the targeted stations spatially mapped with precode matrix "Q";

receiving crosstalk feedback from at least one of the targeted stations response to the MU-MIMO downlink packets;

combining the P1AC matrix and the received crosstalk feedback into an offset matrix;

deriving an adjusted precode matrix "Q'" by additively combining the precode matrix "Q" with the offset matrix;

spatially mapping subsequently transmitted MU-MIMO downlink packets to the targeted stations with the adjusted precode matrix "Q'"; and;

repeating the receiving, combining, driving, and spatially mapping acts to increase an interval between explicit soundings.

5. The method for operating a WAP of claim 4, wherein the act of receiving crosstalk feedback further comprises:

receiving crosstalk feedback in acknowledgment (ACK) packets from the targeted stations to avoid interruption of the MU-MIMO downlink.

6. The method for operating a WAP of claim 4, wherein the MAC matrix determined in the determining act corresponds to: $-\overline{H}^+(\overline{H}\overline{H}^+)^{-1}$ where $\overline{H}$ is a channel matrix.

* * * * *